US010082876B2

(12) United States Patent
Chi et al.

(10) Patent No.: US 10,082,876 B2
(45) Date of Patent: Sep. 25, 2018

(54) MOBILE TERMINAL AND CONTROLLING METHOD THEREOF

(71) Applicant: LG Electronics Inc., Seoul (KR)

(72) Inventors: Jumin Chi, Seoul (KR); Jonghwan Kim, Seoul (KR); Younghoon Song, Seoul (KR); Yung Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 18 days.

(21) Appl. No.: 15/004,782

(22) Filed: Jan. 22, 2016

(65) Prior Publication Data
US 2017/0038845 A1 Feb. 9, 2017

(30) Foreign Application Priority Data

Aug. 5, 2015 (KR) ........................ 10-2015-0110535

(51) Int. Cl.
*G06F 1/16* (2006.01)
*G06F 3/0346* (2013.01)
(Continued)

(52) U.S. Cl.
CPC .............. *G06F 3/017* (2013.01); *G06F 1/163* (2013.01); *G06F 3/0346* (2013.01);
(Continued)

(58) Field of Classification Search
CPC ....................................................... G06F 1/163
See application file for complete search history.

(56) References Cited

U.S. PATENT DOCUMENTS 6,359,837 B1 * 3/2002 Tsukamoto ............ G03B 17/24
368/10
8,988,349 B2 * 3/2015 Alberth .................. G06F 1/163
345/158
(Continued)

FOREIGN PATENT DOCUMENTS

EP 2357548 8/2011
EP 2698686 2/2014
(Continued)

OTHER PUBLICATIONS

European Patent Office Application Serial No. 16161747.7, Search Report dated Dec. 9, 2016, 7 pages.
(Continued)

*Primary Examiner* — Amr Awad
*Assistant Examiner* — Stephen Bray
(74) *Attorney, Agent, or Firm* — Lee, Hong, Degerman, Kang & Waimey

(57) ABSTRACT

A wearable watch type mobile terminal of a watch type, comprising: a display unit, and a controller configured to: cause the display to if the display unit is set to a landscape mode, control display an object indicating an occurrence of an event to be outputted through the display unit when the display is positioned in a first orientation, if a prescribed gesture input is received, switch the display unit to a portrait mode from the landscape mode, and control cause the display to display a detailed information of the event to be outputted through the display unit when the display unit is moved to be in a second orientation according to movement of an arm on which the mobile terminal is worn, wherein the detailed information is not displayed while the object is displayed on the display positioned in the first orientation switched into the portrait mode.

20 Claims, 51 Drawing Sheets

(51) Int. Cl.
*G06F 3/0484* (2013.01)
*G06F 3/0488* (2013.01)
*G06F 3/01* (2006.01)
*H04M 1/05* (2006.01)
*G06F 3/16* (2006.01)
*H04L 12/58* (2006.01)
*H04M 1/725* (2006.01)
*H04B 1/3827* (2015.01)

(52) U.S. Cl.
CPC ...... *G06F 3/04845* (2013.01); *G06F 3/04847* (2013.01); *G06F 3/04883* (2013.01); *G06F 3/16* (2013.01); *H04B 1/385* (2013.01); *H04L 51/38* (2013.01); *H04M 1/05* (2013.01); *H04M 1/72519* (2013.01); *G06F 2200/1614* (2013.01); *G06F 2203/04803* (2013.01); *G06F 2203/04808* (2013.01); *H04B 2001/3861* (2013.01); *H04M 1/72597* (2013.01); *H04M 2250/12* (2013.01)

(56) References Cited

U.S. PATENT DOCUMENTS

| | | | | |
|---|---|---|---|---|
| 9,584,645 | B2* | 2/2017 | Cronin | H04B 1/385 |
| 2005/0276164 | A1 | 12/2005 | Amron | |
| 2011/0179377 | A1* | 7/2011 | Fleming | G06F 9/541 |
| | | | | 715/779 |
| 2012/0130720 | A1* | 5/2012 | Suda | H04N 1/00129 |
| | | | | 704/276 |
| 2013/0154970 | A1* | 6/2013 | Seo | G06F 3/0488 |
| | | | | 345/173 |
| 2013/0262298 | A1* | 10/2013 | Morley | H04M 1/05 |
| | | | | 705/39 |
| 2014/0028546 | A1* | 1/2014 | Jeon | G06F 3/014 |
| | | | | 345/156 |
| 2014/0139422 | A1 | 5/2014 | Mistry et al. | |
| 2014/0160078 | A1* | 6/2014 | Seo | G06F 3/017 |
| | | | | 345/175 |
| 2015/0185944 | A1* | 7/2015 | Magi | G06F 1/1652 |
| | | | | 345/174 |
| 2015/0213580 | A1* | 7/2015 | Yamano | G09G 3/20 |
| | | | | 345/649 |
| 2015/0223355 | A1* | 8/2015 | Fleck | H05K 5/026 |
| | | | | 361/679.03 |
| 2015/0227245 | A1* | 8/2015 | Inagaki | G06F 3/0412 |
| | | | | 345/173 |
| 2015/0350296 | A1* | 12/2015 | Yang | H04L 67/025 |
| | | | | 715/740 |

FOREIGN PATENT DOCUMENTS

| | | |
|---|---|---|
| EP | 2741176 | 6/2014 |
| EP | 2827226 | 1/2015 |
| EP | 2866101 | 4/2015 |
| KR | 10-2015-0029453 | 3/2015 |
| WO | 2013148596 | 10/2013 |
| WO | 2014168300 | 10/2014 |
| WO | 2014175513 | 10/2014 |
| WO | 2015083895 | 6/2015 |
| WO | 2015099957 | 7/2015 |

OTHER PUBLICATIONS

PCT International Application No. PCT/KR2016/000637, Written Opinion of the International Searching Authority dated May 9, 2016, 11 pages.
European Patent Office Application Serial No. 16161747.7, Office Action dated Nov. 22, 2017, 5 pages.
European Patent Office Application Serial No. 16161747.7, Search Report dated Mar. 7, 2017, 21 pages.
IPhone Hacks, "Selective Reading Gives You Control Over Read Receipts in iMessage," Mar. 9, 2013, XP055349666, 6 pages.
Aguilar, N., "How to Take Secret Screenshots of Snapchat Pictures in iOS 7 Without Notifying the Sender," Gadget Hacks, Sep. 20, 2013, XP055349868, 7 pages.
Horwitz, J., "Feign ignorance forever—this app lets you read texts without the sender knowing," Tech in Asia, Sep. 1, 2014, XP055349875, 3 pages.

\* cited by examiner

FIG. 4B
<Landscape mode>
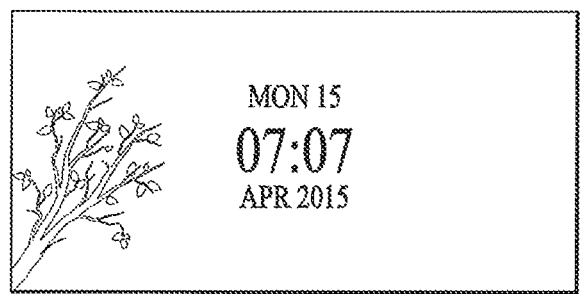
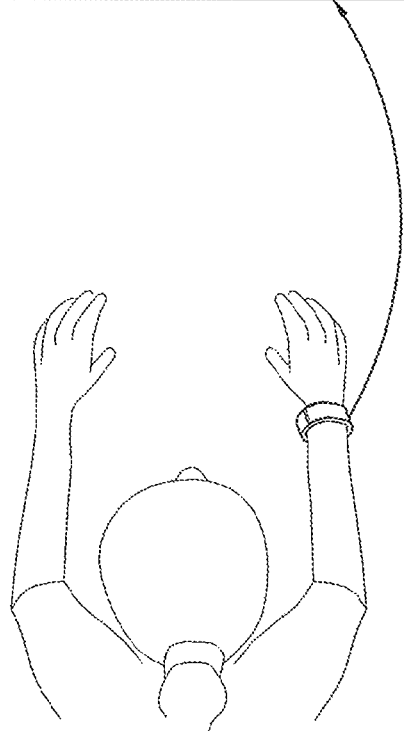
<Unfolded arm state>

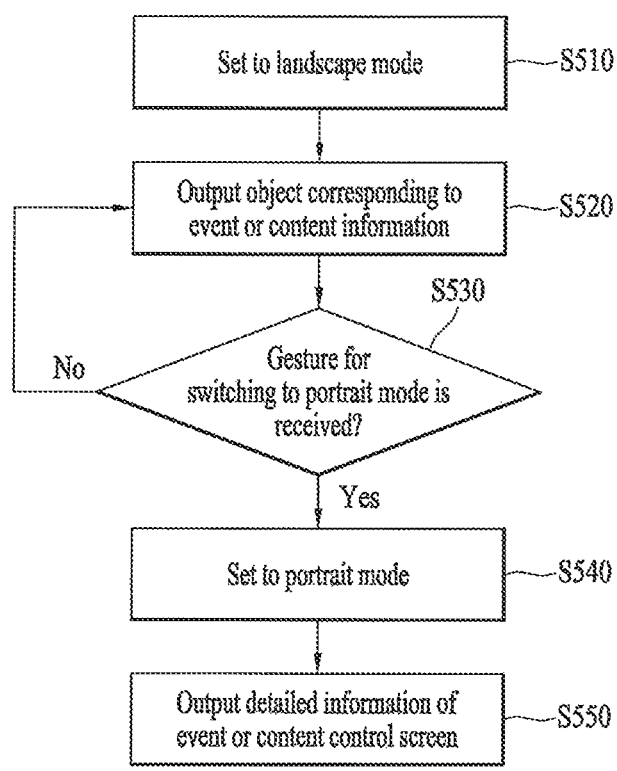

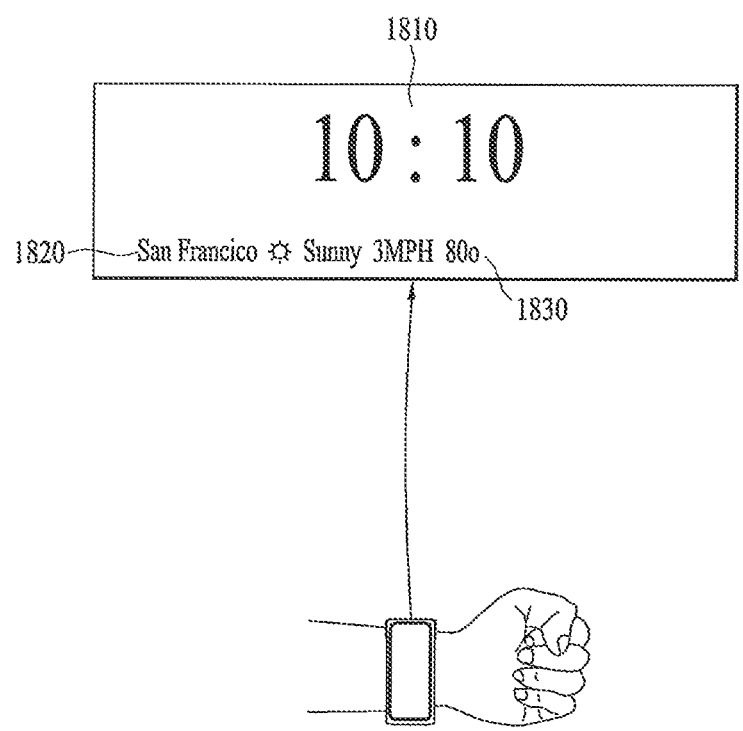

MOBILE TERMINAL AND CONTROLLING METHOD THEREOF

CROSS-REFERENCE TO RELATED APPLICATIONS

Pursuant to 35 U.S.C. § 119(a), this application claims the benefit of earlier filing date and right of priority to Korean Patent Application No. 10-2015-0110535, filed on Aug. 5, 2015, the contents of which are hereby incorporated by reference herein in its entirety.

BACKGROUND OF THE INVENTION

Field of the Invention

The present invention relates to a mobile terminal, and more particularly, to a mobile terminal of a watch type and controlling method thereof. Although the present invention is suitable for a wide scope of applications, it is particularly suitable for outputting appropriate information in accordance with an output mode of a display unit.

Discussion of the Related Art

Terminals may be generally classified as mobile/portable terminals or stationary terminals according to their mobility. Mobile terminals may also be classified as handheld terminals or vehicle mounted terminals according to whether or not a user can directly carry the terminal.

A function of a mobile terminal is diversifying. For instance, the function of the mobile terminal may include data and audio communication, picture and video capturing via a camera, voice recording, playing a music file via a speaker system and outputting an image or a video on a display unit. Some terminals perform a function of an electronic game or a function of a multimedia player. In particular, a latest mobile terminal can receive a multicast signal providing visual contents such as a broadcast, a video and a television program.

As a function of a terminal is diversified, the terminal is implemented in a multimedia player form equipped with complex functions including capturing a picture or a video, playing music or a video file, gaming, receiving a broadcast and the like for example.

To further increase portability of a mobile terminal, many ongoing efforts are mode to research and develop a mobile terminal of a type wearable on a wrist like a watch. Unlike the typical mobile terminals, a mobile terminal of a wearable type is advantageous in being always carried on a user's body. It is inconvenient for a user to take out a mobile terminal of a traditional bar or folder type from a pocket or bag if necessary. Yet, since a wearable device can be always carried on a user's body, it is advantageous in that the user can check contents of the mobile terminal at any time.

Since a watch type mobile terminal is usually worn on a wrist, if the wrist is exposed to a third party, anyone can check informations outputted through a display unit. However, it is not preferable that such a private information as a message is exposed to a third party. Hence, the demand for a means for preventing a private information from being exposed to a third party in outputting the private information through a display unit is increasingly rising.

SUMMARY OF THE INVENTION

Accordingly, embodiments of the present invention are directed to a mobile terminal and controlling method thereof that substantially obviate one or more problems due to limitations and disadvantages of the related art.

An object of the present invention is to provide a mobile terminal and controlling method thereof, by which user's convenience can be enhanced.

In particular, one object of the present invention is to provide a mobile terminal and controlling method thereof, by which whether to output a detailed information of an event is determined in accordance with an output mode of a display unit.

Another object of the present invention is to provide a mobile terminal and controlling method thereof, by which whether to output a detailed information of an event is determined in accordance with a gesture input of moving the mobile terminal.

Additional advantages, objects, and features of the invention will be set forth in the disclosure herein as well as the accompanying drawings. Such aspects may also be appreciated by those skilled in the art based on the disclosure herein.

To achieve these objects and other advantages and in accordance with the purpose of the invention, as embodied and broadly described herein, as embodied and broadly described herein, a watch type mobile terminal according to one embodiment of the present invention may include a display unit, and a controller configured to: cause the display to if the display unit is set to a landscape mode, control display an object indicating an occurrence of an event to be outputted through the display unit when the display is positioned in a first orientation, if a prescribed gesture input is received, switch the display unit to a portrait mode from the landscape mode, and control cause the display to display a detailed information of the event to be outputted through the display unit when the display unit is moved to be in a second orientation according to movement of an arm on which the mobile terminal is worn, wherein the detailed information is not displayed while the object is displayed on the display positioned in the first orientation switched into the portrait mode.

In another aspect of the present invention, as embodied and broadly described herein, a method of controlling a watch type mobile terminal according to another embodiment of the present invention may comprise displaying an object indicating an occurrence of an event when a display unit is set to positioned in a landscape mode first orientation, if a prescribed gesture input is received, switching the display unit to a portrait mode from the landscape mode, and displaying a detailed information of the event when the display unit is switched into the landscape mode moved to be in a second orientation according to movement of an arm on which the mobile terminal is worn, wherein the detailed information is not displayed while the object is displayed on the display positioned in the first orientation.

Effects obtainable from the present invention may be non-limited by the above mentioned effect. And, other unmentioned effects can be clearly understood from the following description by those having ordinary skill in the technical field to which the present invention pertains.

It is to be understood that both the foregoing general description and the following detailed description of the present invention are exemplary and explanatory and are intended to provide further explanation of the invention as claimed.

BRIEF DESCRIPTION OF THE DRAWINGS

The present invention will become more fully understood from the detailed description given herein below and the accompanying drawings, which are given by illustration only, and thus are not limitative of the present invention, and wherein:

FIGS. 4A and 4B are diagrams to describe a portrait mode and a landscape mode of a watch type terminal;

FIG. 5 is a flowchart for an operation of a mobile terminal according to the present invention;

FIGS. 18A and 18B are diagrams for one example of displaying a content received from a feed server;

DETAILED DESCRIPTION OF THE INVENTION

Description will now be given in detail according to exemplary embodiments disclosed herein, with reference to the accompanying drawings. For the sake of brief description with reference to the drawings, the same or equivalent components may be provided with the same reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be connected with the other element or intervening elements may also be present. In contrast, when an element is referred to as being "directly connected with" another element, there are no intervening elements present.

A singular representation may include a plural representation unless it represents a definitely different meaning from the context. Terms such as "include" or "has" are used herein and should be understood that they are intended to indicate an existence of several components, functions or steps, disclosed in the specification, and it is also understood that greater or fewer components, functions, or steps may likewise be utilized.

Mobile terminals presented herein may be implemented using a variety of different types of terminals. Examples of such terminals include cellular phones, smart phones, user equipment, laptop computers, digital broadcast terminals, personal digital assistants (PDAs), portable multimedia players (PMPs), navigators, portable computers (PCs), slate PCs, tablet PCs, ultra books, wearable devices (for example, smart watches, smart glasses, head mounted displays (HMDs)), and the like.

By way of non-limiting example only, further description will be made with reference to particular types of mobile terminals. However, such teachings apply equally to other types of terminals, such as those types noted above. In addition, these teachings may also be applied to stationary terminals such as digital TV, desktop computers, and the like.

Figure 1A:
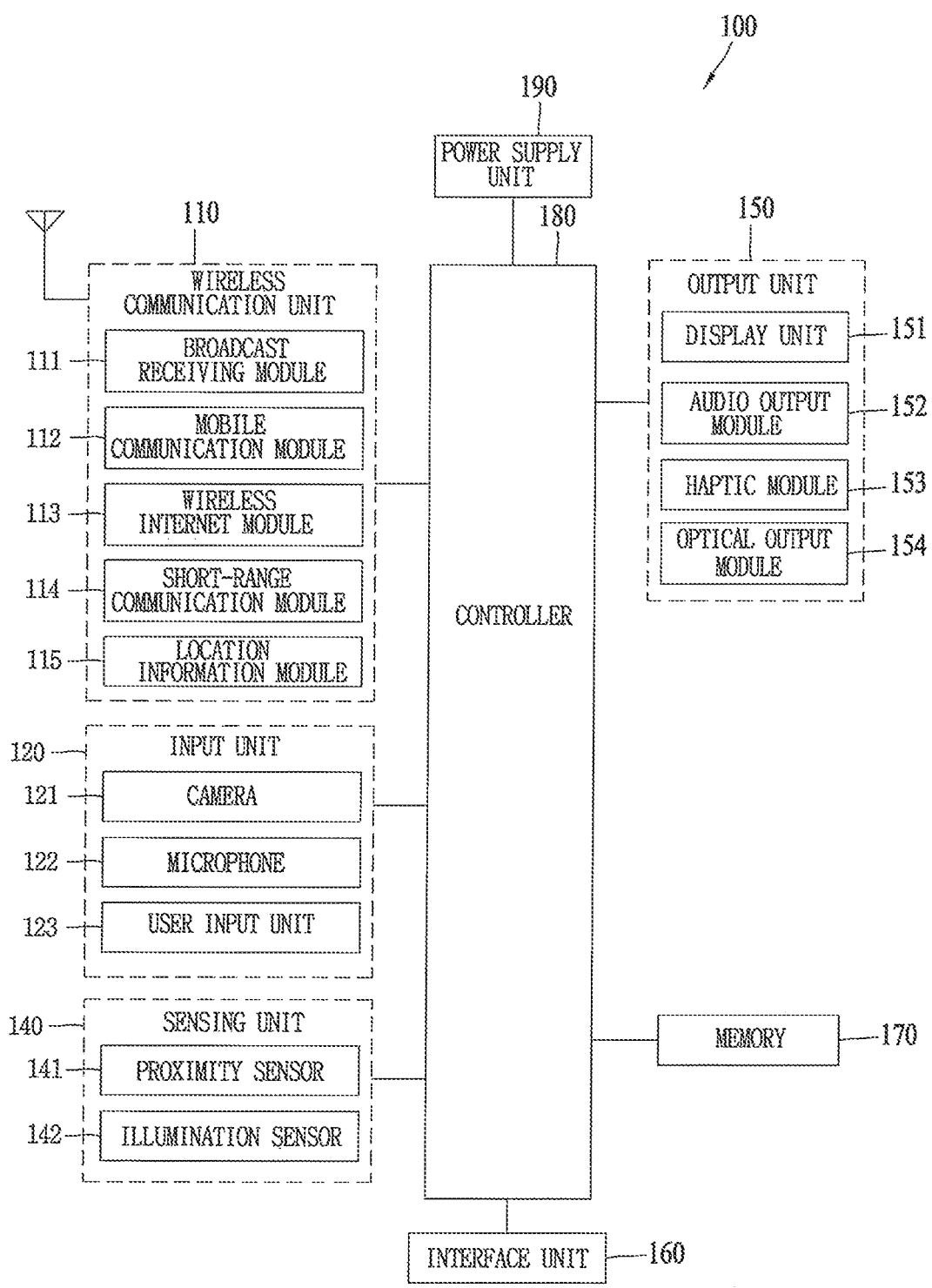
FIG. 1A is a block diagram of a mobile terminal in accordance with the present disclosure.
Figure 1B:
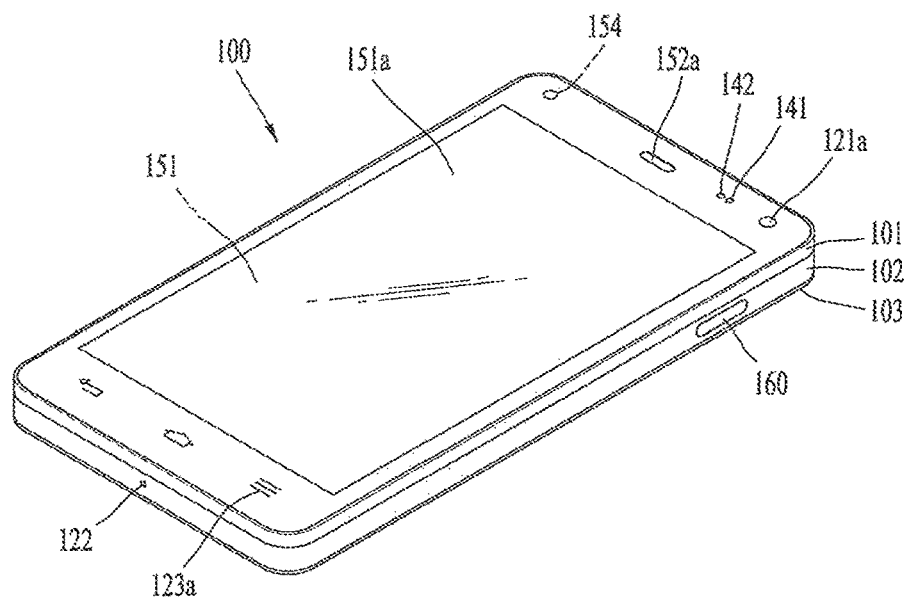
FIGS. 1B and 1C are conceptual views of one example of the mobile terminal, viewed from different directions.
Figure 1C:
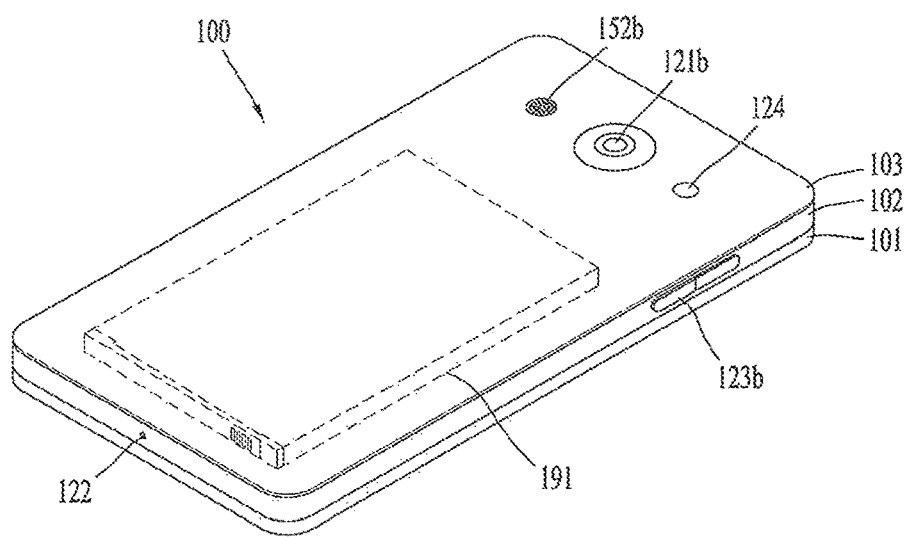

Reference is now made to FIGS. 1A-1C, where FIG. 1A is a block diagram of a mobile terminal in accordance with the present disclosure, and FIGS. 1B and 1C are conceptual views of one example of the mobile terminal, viewed from different directions.

The mobile terminal 100 is shown having components such as a wireless communication unit 110, an input unit 120, a sensing unit 140, an output unit 150, an interface unit 160, a memory 170, a controller 180, and a power supply unit 190. It is understood that implementing all of the illustrated components is not a requirement, and that greater or fewer components may alternatively be implemented.

Referring now to FIG. 1A, the mobile terminal 100 is shown having wireless communication unit 110 configured with several commonly implemented components. For instance, the wireless communication unit 110 typically includes one or more components which permit wireless communication between the mobile terminal 100 and a wireless communication system or network within which the mobile terminal is located.

The wireless communication unit 110 typically includes one or more modules which permit communications such as wireless communications between the mobile terminal 100 and a wireless communication system, communications between the mobile terminal 100 and another mobile terminal, communications between the mobile terminal 100 and an external server. Further, the wireless communication unit 110 typically includes one or more modules which connect the mobile terminal 100 to one or more networks. To facilitate such communications, the wireless communication unit 110 includes one or more of a broadcast receiving module 111, a mobile communication module 112, a wireless Internet module 113, a short-range communication module 114, and a location information module 115.

The input unit 120 includes a camera 121 for obtaining images or video, a microphone 122, which is one type of audio input device for inputting an audio signal, and a user input unit 123 (for example, a touch key, a push key, a mechanical key, a soft key, and the like) for allowing a user to input information. Data (for example, audio, video, image, and the like) is obtained by the input unit 120 and may be analyzed and processed by controller 180 according to device parameters, user commands, and combinations thereof.

The sensing unit 140 is typically implemented using one or more sensors configured to sense internal information of the mobile terminal, the surrounding environment of the mobile terminal, user information, and the like. For example, in FIG. 1A, the sensing unit 140 is shown having a proximity sensor 141 and an illumination sensor 142.

If desired, the sensing unit 140 may alternatively or additionally include other types of sensors or devices, such as a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few. The mobile terminal 100 may be configured to utilize information obtained from sensing unit 140, and in particular, information obtained from one or more sensors of the sensing unit 140, and combinations thereof.

The output unit 150 is typically configured to output various types of information, such as audio, video, tactile output, and the like. The output unit 150 is shown having a display unit 151, an audio output module 152, a haptic module 153, and an optical output module 154.

The display unit 151 may have an inter-layered structure or an integrated structure with a touch sensor in order to facilitate a touch screen. The touch screen may provide an output interface between the mobile terminal 100 and a user, as well as function as the user input unit 123 which provides an input interface between the mobile terminal 100 and the user.

The interface unit 160 serves as an interface with various types of external devices that can be coupled to the mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 160.

The memory 170 is typically implemented to store data to support various functions or features of the mobile terminal 100. For instance, the memory 170 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). It is common for application programs to be stored in the memory 170, installed in the mobile terminal 100, and executed by the controller 180 to perform an operation (or function) for the mobile terminal 100.

The controller 180 typically functions to control overall operation of the mobile terminal 100, in addition to the operations associated with the application programs. The controller 180 may provide or process information or functions appropriate for a user by processing signals, data, information and the like, which are input or output by the various components depicted in FIG. 1A, or activating application programs stored in the memory 170. As one example, the controller 180 controls some or all of the components illustrated in FIGS. 1A-1C according to the execution of an application program that have been stored in the memory 170.

The power supply unit 190 can be configured to receive external power or provide internal power in order to supply appropriate power required for operating elements and components included in the mobile terminal 100. The power supply unit 190 may include a battery, and the battery may be configured to be embedded in the terminal body, or configured to be detachable from the terminal body.

Referring still to FIG. 1A, various components depicted in this figure will now be described in more detail. Regarding the wireless communication unit 110, the broadcast receiving module 111 is typically configured to receive a broadcast signal and/or broadcast associated information from an external broadcast managing entity via a broadcast channel. The broadcast channel may include a satellite channel, a terrestrial channel, or both. In some embodiments, two or more broadcast receiving modules 111 may be utilized to facilitate simultaneously receiving of two or more broadcast channels, or to support switching among broadcast channels.

The mobile communication module 112 can transmit and/or receive wireless signals to and from one or more network entities. Typical examples of a network entity include a base station, an external mobile terminal, a server, and the like. Such network entities form part of a mobile communication network, which is constructed according to technical standards or communication methods for mobile communications (for example, Global System for Mobile Communication (GSM), Code Division Multi Access (CDMA), CDMA2000 (Code Division Multi Access 2000), EV-DO (Enhanced Voice-Data Optimized or Enhanced Voice-Data Only), Wideband CDMA (WCDMA), High Speed Downlink Packet access (HSDPA), HSUPA (High Speed Uplink Packet Access), Long Term Evolution (LTE), LTE-A (Long Term Evolution-Advanced), and the like). Examples of wireless signals transmitted and/or received via the mobile communication module 112 include audio call signals, video (telephony) call signals, or various formats of data to support communication of text and multimedia messages.

The wireless Internet module 113 is configured to facilitate wireless Internet access. This module may be internally or externally coupled to the mobile terminal 100. The wireless Internet module 113 may transmit and/or receive wireless signals via communication networks according to wireless Internet technologies.

Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), HSUPA (High Speed Uplink Packet Access), Long Term Evolution (LTE), LTE-A (Long Term Evolution-Advanced), and the like. The wireless Internet module 113 may transmit/receive data according to one or more of such wireless Internet technologies, and other Internet technologies as well.

In some embodiments, when the wireless Internet access is implemented according to, for example, WiBro, HSDPA, HSUPA, GSM, CDMA, WCDMA, LTE, LTE-A and the like, as part of a mobile communication network, the wireless Internet module 113 performs such wireless Internet access. As such, the Internet module 113 may cooperate with, or function as, the mobile communication module 112.

The short-range communication module 114 is configured to facilitate short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like. The short-range communication module 114 in general supports wireless communications between the mobile terminal 100 and a wireless communication system, communications between the mobile terminal 100 and another mobile terminal 100, or communications between the mobile terminal and a network where another mobile terminal 100 (or an external server) is located, via wireless area networks. One example of the wireless area networks is a wireless personal area networks.

In some embodiments, another mobile terminal (which may be configured similarly to mobile terminal 100) may be a wearable device, for example, a smart watch, a smart glass or a head mounted display (HMD), which is able to exchange data with the mobile terminal 100 (or otherwise cooperate with the mobile terminal 100). The short-range communication module 114 may sense or recognize the wearable device, and permit communication between the wearable device and the mobile terminal 100. In addition, when the sensed wearable device is a device which is authenticated to communicate with the mobile terminal 100, the controller 180, for example, may cause transmission of data processed in the mobile terminal 100 to the wearable device via the short-range communication module 114. Hence, a user of the wearable device may use the data processed in the mobile terminal 100 on the wearable device. For example, when a call is received in the mobile terminal 100, the user may answer the call using the wearable device. Also, when a message is received in the mobile terminal 100, the user can check the received message using the wearable device.

The location information module 115 is generally configured to detect, calculate, derive or otherwise identify a position of the mobile terminal. As an example, the location information module 115 includes a Global Position System (GPS) module, a Wi-Fi module, or both. If desired, the location information module 115 may alternatively or additionally function with any of the other modules of the wireless communication unit 110 to obtain data related to the position of the mobile terminal.

As one example, when the mobile terminal uses a GPS module, a position of the mobile terminal may be acquired using a signal sent from a GPS satellite. As another example, when the mobile terminal uses the Wi-Fi module, a position of the mobile terminal can be acquired based on information related to a wireless access point (AP) which transmits or receives a wireless signal to or from the Wi-Fi module.

The input unit 120 may be configured to permit various types of input to the mobile terminal 120. Examples of such input include audio, image, video, data, and user input. Image and video input is often obtained using one or more cameras 121. Such cameras 121 may process image frames of still pictures or video obtained by image sensors in a video or image capture mode. The processed image frames can be displayed on the display unit 151 or stored in memory 170. In some cases, the cameras 121 may be arranged in a matrix configuration to permit a plurality of images having various angles or focal points to be input to the mobile terminal 100. As another example, the cameras 121 may be located in a stereoscopic arrangement to acquire left and right images for implementing a stereoscopic image.

The microphone 122 is generally implemented to permit audio input to the mobile terminal 100. The audio input can be processed in various manners according to a function being executed in the mobile terminal 100. If desired, the microphone 122 may include assorted noise removing algorithms to remove unwanted noise generated in the course of receiving the external audio.

The user input unit 123 is a component that permits input by a user. Such user input may enable the controller 180 to control operation of the mobile terminal 100. The user input unit 123 may include one or more of a mechanical input element (for example, a key, a button located on a front and/or rear surface or a side surface of the mobile terminal 100, a dome switch, a jog wheel, a jog switch, and the like), or a touch-sensitive input, among others. As one example, the touch-sensitive input may be a virtual key or a soft key, which is displayed on a touch screen through software processing, or a touch key which is located on the mobile terminal at a location that is other than the touch screen. On the other hand, the virtual key or the visual key may be displayed on the touch screen in various shapes, for example, graphic, text, icon, video, or a combination thereof.

The sensing unit 140 is generally configured to sense one or more of internal information of the mobile terminal, surrounding environment information of the mobile terminal, user information, or the like. The controller 180 generally cooperates with the sending unit 140 to control operation of the mobile terminal 100 or execute data processing, a function or an operation associated with an application program installed in the mobile terminal based on the sensing provided by the sensing unit 140. The sensing unit 140 may be implemented using any of a variety of sensors, some of which will now be described in more detail.

The proximity sensor 141 may include a sensor to sense presence or absence of an object approaching a surface, or an object located near a surface, by using an electromagnetic field, infrared rays, or the like without a mechanical contact.

The proximity sensor 141 may be arranged at an inner region of the mobile terminal covered by the touch screen, or near the touch screen.

The proximity sensor 141, for example, may include any of a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and the like. When the touch screen is implemented as a capacitance type, the proximity sensor 141 can sense proximity of a pointer relative to the touch screen by changes of an electromagnetic field, which is responsive to an approach of an object with conductivity. In this case, the touch screen (touch sensor) may also be categorized as a proximity sensor.

The term "proximity touch" will often be referred to herein to denote the scenario in which a pointer is positioned to be proximate to the touch screen without contacting the touch screen. The term "contact touch" will often be referred to herein to denote the scenario in which a pointer makes physical contact with the touch screen. For the position corresponding to the proximity touch of the pointer relative to the touch screen, such position will correspond to a position where the pointer is perpendicular to the touch screen. The proximity sensor 141 may sense proximity touch, and proximity touch patterns (for example, distance, direction, speed, time, position, moving status, and the like).

In general, controller 180 processes data corresponding to proximity touches and proximity touch patterns sensed by the proximity sensor 141, and cause output of visual information on the touch screen. In addition, the controller 180 can control the mobile terminal 100 to execute different operations or process different data according to whether a touch with respect to a point on the touch screen is either a proximity touch or a contact touch.

A touch sensor can sense a touch applied to the touch screen, such as display unit 151, using any of a variety of touch methods. Examples of such touch methods include a resistive type, a capacitive type, an infrared type, and a magnetic field type, among others.

As one example, the touch sensor may be configured to convert changes of pressure applied to a specific part of the display unit 151, or convert capacitance occurring at a specific part of the display unit 151, into electric input signals. The touch sensor may also be configured to sense not only a touched position and a touched area, but also touch pressure and/or touch capacitance. A touch object is generally used to apply a touch input to the touch sensor. Examples of typical touch objects include a finger, a touch pen, a stylus pen, a pointer, or the like.

When a touch input is sensed by a touch sensor, corresponding signals may be transmitted to a touch controller. The touch controller may process the received signals, and then transmit corresponding data to the controller 180. Accordingly, the controller 180 may sense which region of the display unit 151 has been touched. Here, the touch controller may be a component separate from the controller 180, the controller 180, and combinations thereof.

In some embodiments, the controller 180 may execute the same or different controls according to a type of touch object that touches the touch screen or a touch key provided in addition to the touch screen. Whether to execute the same or different control according to the object which provides a touch input may be decided based on a current operating state of the mobile terminal 100 or a currently executed application program, for example.

The touch sensor and the proximity sensor may be implemented individually, or in combination, to sense various types of touches. Such touches includes a short (or tap) touch, a long touch, a multi-touch, a drag touch, a flick touch, a pinch-in touch, a pinch-out touch, a swipe touch, a hovering touch, and the like.

If desired, an ultrasonic sensor may be implemented to recognize position information relating to a touch object using ultrasonic waves. The controller 180, for example, may calculate a position of a wave generation source based on information sensed by an illumination sensor and a plurality of ultrasonic sensors. Since light is much faster than ultrasonic waves, the time for which the light reaches the optical sensor is much shorter than the time for which the ultrasonic wave reaches the ultrasonic sensor. The position of the wave generation source may be calculated using this fact. For instance, the position of the wave generation source may be calculated using the time difference from the time that the ultrasonic wave reaches the sensor based on the light as a reference signal.

The camera 121 typically includes at least one a camera sensor (CCD, CMOS etc.), a photo sensor (or image sensors), and a laser sensor.

Implementing the camera 121 with a laser sensor may allow detection of a touch of a physical object with respect to a 3D stereoscopic image. The photo sensor may be laminated on, or overlapped with, the display device. The photo sensor may be configured to scan movement of the physical object in proximity to the touch screen. In more detail, the photo sensor may include photo diodes and transistors at rows and columns to scan content received at the photo sensor using an electrical signal which changes according to the quantity of applied light. Namely, the photo sensor may calculate the coordinates of the physical object according to variation of light to thus obtain position information of the physical object.

The display unit 151 is generally configured to output information processed in the mobile terminal 100. For example, the display unit 151 may display execution screen information of an application program executing at the mobile terminal 100 or user interface (UI) and graphic user interface (GUI) information in response to the execution screen information.

In some embodiments, the display unit 151 may be implemented as a stereoscopic display unit for displaying stereoscopic images. A typical stereoscopic display unit may employ a stereoscopic display scheme such as a stereoscopic scheme (a glass scheme), an auto-stereoscopic scheme (glassless scheme), a projection scheme (holographic scheme), or the like.

The audio output module 152 is generally configured to output audio data. Such audio data may be obtained from any of a number of different sources, such that the audio data may be received from the wireless communication unit 110 or may have been stored in the memory 170. The audio data may be output during modes such as a signal reception mode, a call mode, a record mode, a voice recognition mode, a broadcast reception mode, and the like. The audio output module 152 can provide audible output related to a particular function (e.g., a call signal reception sound, a message reception sound, etc.) performed by the mobile terminal 100. The audio output module 152 may also be implemented as a receiver, a speaker, a buzzer, or the like.

A haptic module 153 can be configured to generate various tactile effects that a user feels, perceive, or otherwise experience. A typical example of a tactile effect generated by the haptic module 153 is vibration. The strength, pattern and the like of the vibration generated by the haptic module 153 can be controlled by user selection or setting by the controller. For example, the haptic module 153 may output different vibrations in a combining manner or a sequential manner.

Besides vibration, the haptic module 153 can generate various other tactile effects, including an effect by stimulation such as a pin arrangement vertically moving to contact skin, a spray force or suction force of air through a jet orifice or a suction opening, a touch to the skin, a contact of an electrode, electrostatic force, an effect by reproducing the sense of cold and warmth using an element that can absorb or generate heat, and the like.

The haptic module 153 can also be implemented to allow the user to feel a tactile effect through a muscle sensation such as the user's fingers or arm, as well as transferring the tactile effect through direct contact. Two or more haptic modules 153 may be provided according to the particular configuration of the mobile terminal 100.

An optical output module 154 can output a signal for indicating an event generation using light of a light source. Examples of events generated in the mobile terminal 100 may include message reception, call signal reception, a missed call, an alarm, a schedule notice, an email reception, information reception through an application, and the like.

A signal output by the optical output module 154 may be implemented in such a manner that the mobile terminal emits monochromatic light or light with a plurality of colors. The signal output may be terminated as the mobile terminal senses that a user has checked the generated event, for example.

The interface unit 160 serves as an interface for external devices to be connected with the mobile terminal 100. For example, the interface unit 160 can receive data transmitted from an external device, receive power to transfer to elements and components within the mobile terminal 100, or transmit internal data of the mobile terminal 100 to such external device. The interface unit 160 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating authority of using the mobile terminal 100 and may include a user identity module (UIM), a subscriber identity module (SIM), a universal subscriber identity module (USIM), and the like. In addition, the device having the identification module (also referred to herein as an "identifying device") may take the form of a smart card. Accordingly, the identifying device can be connected with the terminal 100 via the interface unit 160.

When the mobile terminal 100 is connected with an external cradle, the interface unit 160 can serve as a passage to allow power from the cradle to be supplied to the mobile terminal 100 or may serve as a passage to allow various command signals input by the user from the cradle to be transferred to the mobile terminal there through. Various command signals or power input from the cradle may operate as signals for recognizing that the mobile terminal is properly mounted on the cradle.

The memory 170 can store programs to support operations of the controller 180 and store input/output data (for example, phonebook, messages, still images, videos, etc.). The memory 170 may store data related to various patterns of vibrations and audio which are output in response to touch inputs on the touch screen.

The memory 170 may include one or more types of storage mediums including a Flash memory, a hard disk, a solid state disk, a silicon disk, a multimedia card micro type, a card-type memory (e.g., SD or DX memory, etc), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, an optical disk, and the like. The mobile terminal 100 may also be operated in relation to a network storage device that performs the storage function of the memory 170 over a network, such as the Internet.

The controller 180 may typically control the general operations of the mobile terminal 100. For example, the controller 180 may set or release a lock state for restricting a user from inputting a control command with respect to applications when a status of the mobile terminal meets a preset condition.

The controller 180 can also perform the controlling and processing associated with voice calls, data communications, video calls, and the like, or perform pattern recognition processing to recognize a handwriting input or a picture drawing input performed on the touch screen as characters or images, respectively. In addition, the controller 180 can control one or a combination of those components in order to implement various exemplary embodiments disclosed herein.

The power supply unit 190 receives external power or provides internal power and supply the appropriate power required for operating respective elements and components included in the mobile terminal 100. The power supply unit 190 may include a battery, which is typically rechargeable or be detachably coupled to the terminal body for charging.

The power supply unit 190 may include a connection port. The connection port may be configured as one example of the interface unit 160 to which an external charger for supplying power to recharge the battery is electrically connected.

As another example, the power supply unit 190 may be configured to recharge the battery in a wireless manner without use of the connection port. In this example, the power supply unit 190 can receive power, transferred from an external wireless power transmitter, using at least one of an inductive coupling method which is based on magnetic induction or a magnetic resonance coupling method which is based on electromagnetic resonance.

Various embodiments described herein may be implemented in a computer-readable medium, a machine-readable medium, or similar medium using, for example, software, hardware, or any combination thereof.

Referring now to FIGS. 1B and 1C, the mobile terminal 100 is described with reference to a bar-type terminal body. However, the mobile terminal 100 may alternatively be implemented in any of a variety of different configurations. Examples of such configurations include watch-type, clip-type, glasses-type, or as a folder-type, flip-type, slide-type, swing-type, and swivel-type in which two and more bodies are combined with each other in a relatively movable manner, and combinations thereof. Discussion herein will often relate to a particular type of mobile terminal (for example, bar-type, watch-type, glasses-type, and the like). However, such teachings with regard to a particular type of mobile terminal will generally apply to other types of mobile terminals as well.

The mobile terminal 100 will generally include a case (for example, frame, housing, cover, and the like) forming the appearance of the terminal. In this embodiment, the case is formed using a front case 101 and a rear case 102. Various electronic components are incorporated into a space formed between the front case 101 and the rear case 102. At least one middle case may be additionally positioned between the front case 101 and the rear case 102.

The display unit 151 is shown located on the front side of the terminal body to output information. As illustrated, a window 151a of the display unit 151 may be mounted to the front case 101 to form the front surface of the terminal body together with the front case 101.

In some embodiments, electronic components may also be mounted to the rear case 102. Examples of such electronic components include a detachable battery 191, an identification module, a memory card, and the like. Rear cover 103 is shown covering the electronic components, and this cover may be detachably coupled to the rear case 102. Therefore, when the rear cover 103 is detached from the rear case 102, the electronic components mounted to the rear case 102 are externally exposed.

As illustrated, when the rear cover 103 is coupled to the rear case 102, a side surface of the rear case 102 is partially exposed. In some cases, upon the coupling, the rear case 102 may also be completely shielded by the rear cover 103. In some embodiments, the rear cover 103 may include an opening for externally exposing a camera 121b or an audio output module 152b.

The cases 101, 102, 103 may be formed by injection-molding synthetic resin or may be formed of a metal, for example, stainless steel (STS), aluminum (Al), titanium (Ti), or the like.

As an alternative to the example in which the plurality of cases form an inner space for accommodating components, the mobile terminal 100 may be configured such that one case forms the inner space. In this example, a mobile terminal 100 having a uni-body is formed in such a manner that synthetic resin or metal extends from a side surface to a rear surface.

If desired, the mobile terminal 100 may include a waterproofing unit (not shown) for preventing introduction of water into the terminal body. For example, the waterproofing unit may include a waterproofing member which is located between the window 151a and the front case 101, between the front case 101 and the rear case 102, or between the rear case 102 and the rear cover 103, to hermetically seal an inner space when those cases are coupled.

FIGS. 1B and 1C depict certain components as arranged on the mobile terminal. However, it is to be understood that alternative arrangements are possible and within the teachings of the instant disclosure. Some components may be omitted or rearranged. For example, the first manipulation unit 123a may be located on another surface of the terminal body, and the second audio output module 152b may be located on the side surface of the terminal body.

The display unit 151 outputs information processed in the mobile terminal 100. The display unit 151 may be implemented using one or more suitable display devices. Examples of such suitable display devices include a liquid crystal display (LCD), a thin film transistor-liquid crystal display (TFT-LCD), an organic light emitting diode (OLED), a flexible display, a 3-dimensional (3D) display, an e-ink display, and combinations thereof.

The display unit 151 may be implemented using two display devices, which can implement the same or different display technology. For instance, a plurality of the display units 151 may be arranged on one side, either spaced apart from each other, or these devices may be integrated, or these devices may be arranged on different surfaces.

The display unit 151 may also include a touch sensor which senses a touch input received at the display unit. When a touch is input to the display unit 151, the touch sensor may be configured to sense this touch and the controller 180, for example, may generate a control command or other signal corresponding to the touch. The content which is input in the touching manner may be a text or numerical value, or a menu item which can be indicated or designated in various modes.

The touch sensor may be configured in a form of a film having a touch pattern, disposed between the window 151a and a display on a rear surface of the window 151a, or a metal wire which is patterned directly on the rear surface of the window 151a. Alternatively, the touch sensor may be integrally formed with the display. For example, the touch sensor may be disposed on a substrate of the display or within the display.

The display unit 151 may also form a touch screen together with the touch sensor. Here, the touch screen may serve as the user input unit 123 (see FIG. 1A). Therefore, the touch screen may replace at least some of the functions of the first manipulation unit 123a.

The first audio output module 152a may be implemented in the form of a speaker to output voice audio, alarm sounds, multimedia audio reproduction, and the like.

The window 151a of the display unit 151 will typically include an aperture to permit audio generated by the first audio output module 152a to pass. One alternative is to allow audio to be released along an assembly gap between the structural bodies (for example, a gap between the window 151a and the front case 101). In this case, a hole independently formed to output audio sounds may not be seen or is otherwise hidden in terms of appearance, thereby further simplifying the appearance and manufacturing of the mobile terminal 100.

The optical output module 154 can be configured to output light for indicating an event generation. Examples of such events include a message reception, a call signal reception, a missed call, an alarm, a schedule notice, an email reception, information reception through an application, and the like. When a user has checked a generated event, the controller can control the optical output unit 154 to stop the light output.

The first camera 121a can process image frames such as still or moving images obtained by the image sensor in a capture mode or a video call mode. The processed image frames can then be displayed on the display unit 151 or stored in the memory 170.

The first and second manipulation units 123a and 123b are examples of the user input unit 123, which may be manipulated by a user to provide input to the mobile terminal 100. The first and second manipulation units 123a and 123b may also be commonly referred to as a manipulating portion, and may employ any tactile method that allows the user to perform manipulation such as touch, push, scroll, or the like. The first and second manipulation units 123a and 123b may also employ any non-tactile method that allows the user to perform manipulation such as proximity touch, hovering, or the like.

FIG. 1B illustrates the first manipulation unit 123a as a touch key, but possible alternatives include a mechanical key, a push key, a touch key, and combinations thereof.

Input received at the first and second manipulation units 123a and 123b may be used in various ways. For example, the first manipulation unit 123a may be used by the user to provide an input to a menu, home key, cancel, search, or the like, and the second manipulation unit 123b may be used by the user to provide an input to control a volume level being output from the first or second audio output modules 152a or 152b, to switch to a touch recognition mode of the display unit 151, or the like.

As another example of the user input unit 123, a rear input unit (not shown) may be located on the rear surface of the terminal body. The rear input unit can be manipulated by a user to provide input to the mobile terminal 100. The input may be used in a variety of different ways. For example, the rear input unit may be used by the user to provide an input for power on/off, start, end, scroll, control volume level being output from the first or second audio output modules 152a or 152b, switch to a touch recognition mode of the display unit 151, and the like. The rear input unit may be configured to permit touch input, a push input, or combinations thereof.

The rear input unit may be located to overlap the display unit 151 of the front side in a thickness direction of the terminal body. As one example, the rear input unit may be located on an upper end portion of the rear side of the terminal body such that a user can easily manipulate it using a forefinger when the user grabs the terminal body with one hand. Alternatively, the rear input unit can be positioned at most any location of the rear side of the terminal body.

Embodiments that include the rear input unit may implement some or all of the functionality of the first manipulation unit 123a in the rear input unit. As such, in situations where the first manipulation unit 123a is omitted from the front side, the display unit 151 can have a larger screen.

As a further alternative, the mobile terminal 100 may include a finger scan sensor which scans a user's fingerprint. The controller 180 can then use fingerprint information sensed by the finger scan sensor as part of an authentication procedure. The finger scan sensor may also be installed in the display unit 151 or implemented in the user input unit 123.

The microphone 122 is shown located at an end of the mobile terminal 100, but other locations are possible. If desired, multiple microphones may be implemented, with such an arrangement permitting the receiving of stereo sounds.

The interface unit 160 may serve as a path allowing the mobile terminal 100 to interface with external devices. For example, the interface unit 160 may include one or more of a connection terminal for connecting to another device (for example, an earphone, an external speaker, or the like), a port for near field communication (for example, an Infrared Data Association (IrDA) port, a Bluetooth port, a wireless LAN port, and the like), or a power supply terminal for supplying power to the mobile terminal 100. The interface unit 160 may be implemented in the form of a socket for accommodating an external card, such as Subscriber Identification Module (SIM), User Identity Module (UIM), or a memory card for information storage.

The second camera 121b is shown located at the rear side of the terminal body and includes an image capturing direction that is substantially opposite to the image capturing direction of the first camera unit 121a. If desired, second camera 121a may alternatively be located at other locations, or made to be moveable, in order to have a different image capturing direction from that which is shown.

The second camera 121b can include a plurality of lenses arranged along at least one line. The plurality of lenses may also be arranged in a matrix configuration. The cameras may be referred to as an "array camera." When the second camera 121b is implemented as an array camera, images may be captured in various manners using the plurality of lenses and images with better qualities.

As shown in FIG. 1C, a flash 124 is shown adjacent to the second camera 121b. When an image of a subject is captured with the camera 121b, the flash 124 may illuminate the subject.

As shown in FIG. 1B, the second audio output module 152b can be located on the terminal body. The second audio output module 152b may implement stereophonic sound functions in conjunction with the first audio output module 152a, and may be also used for implementing a speaker phone mode for call communication.

At least one antenna for wireless communication may be located on the terminal body. The antenna may be installed in the terminal body or formed by the case. For example, an antenna which configures a part of the broadcast receiving module 111 may be retractable into the terminal body. Alternatively, an antenna may be formed using a film attached to an inner surface of the rear cover 103, or a case that includes a conductive material.

A power supply unit 190 for supplying power to the mobile terminal 100 may include a battery 191, which is mounted in the terminal body or detachably coupled to an outside of the terminal body. The battery 191 may receive power via a power source cable connected to the interface unit 160. Also, the battery 191 can be recharged in a wireless manner using a wireless charger. Wireless charging may be implemented by magnetic induction or electromagnetic resonance.

The rear cover 103 is shown coupled to the rear case 102 for shielding the battery 191, to prevent separation of the battery 191, and to protect the battery 191 from an external impact or from foreign material. When the battery 191 is detachable from the terminal body, the rear case 103 may be detachably coupled to the rear case 102.

An accessory for protecting an appearance or assisting or extending the functions of the mobile terminal 100 can also be provided on the mobile terminal 100. As one example of an accessory, a cover or pouch for covering or accommodating at least one surface of the mobile terminal 100 may be provided. The cover or pouch may cooperate with the display unit 151 to extend the function of the mobile terminal 100. Another example of the accessory is a touch pen for assisting or extending a touch input to a touch screen.

Figure 2:
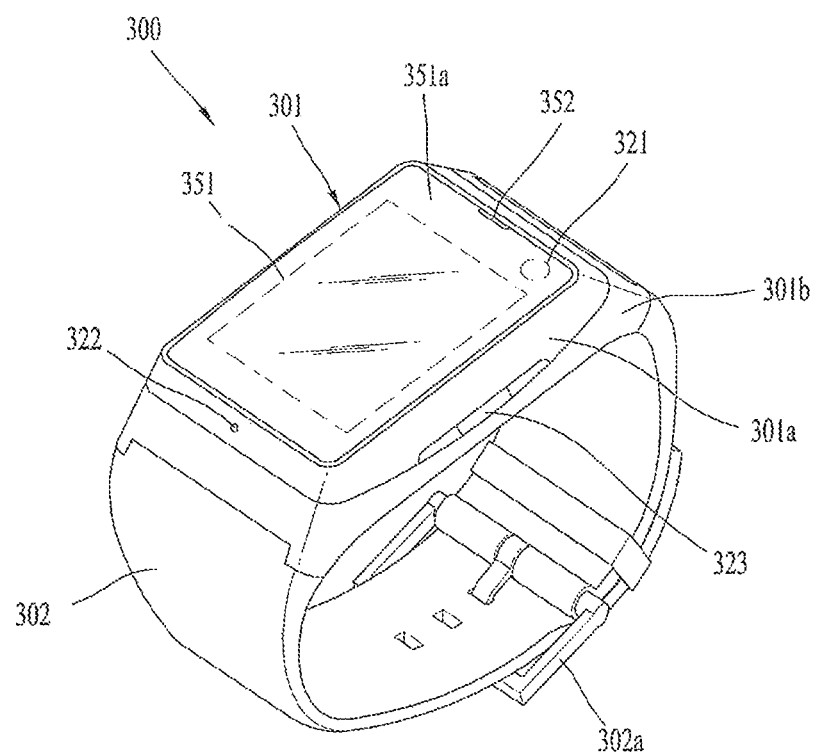
FIG. 2 is a perspective diagram for one example of a mobile terminal of a watch type related to another embodiment of the present invention.

FIG. 2 is a perspective view illustrating one example of a watch-type mobile terminal 200 in accordance with another exemplary embodiment. As illustrated in FIG. 2, the watch-type mobile terminal 200 includes a main body 201 with a display unit 251 and a band 202 connected to the main body 201 to be wearable on a wrist. In general, mobile terminal 200 may be configured to include features that are the same or similar to that of mobile terminal 100 of FIGS. 1A-1C.

The main body 201 may include a case having a certain appearance. As illustrated, the case may include a first case 201a and a second case 201b cooperatively defining an inner space for accommodating various electronic components. Other configurations are possible. For instance, a single case may alternatively be implemented, with such a case being configured to define the inner space, thereby implementing a mobile terminal 200 with a uni-body.

The watch-type mobile terminal 200 can perform wireless communication, and an antenna for the wireless communication can be installed in the main body 201. The antenna may extend its function using the case. For example, a case including a conductive material may be electrically connected to the antenna to extend a ground area or a radiation area.

The display unit 251 is shown located at the front side of the main body 201 so that displayed information is viewable to a user. In some embodiments, the display unit 251 includes a touch sensor so that the display unit can function as a touch screen. As illustrated, window 251a is positioned on the first case 201a to form a front surface of the terminal body together with the first case 201a.

The illustrated embodiment includes audio output module 252, a camera 221, a microphone 222, and a user input unit 223 positioned on the main body 201. When the display unit 251 is implemented as a touch screen, additional function keys may be minimized or eliminated. For example, when the touch screen is implemented, the user input unit 223 may be omitted.

The band 202 is commonly worn on the user's wrist and may be made of a flexible material for facilitating wearing of the device. As one example, the band 202 may be made of fur, rubber, silicon, synthetic resin, or the like. The band 202 may also be configured to be detachable from the main body 201. Accordingly, the band 202 may be replaceable with various types of bands according to a user's preference.

In one configuration, the band 202 may be used for extending the performance of the antenna. For example, the band may include therein a ground extending portion (not shown) electrically connected to the antenna to extend a ground area.

The band 202 may include fastener 202a. The fastener 202a may be implemented into a buckle type, a snap-fit hook structure, a Velcro® type, or the like, and include a flexible section or material. The drawing illustrates an example that the fastener 202a is implemented using a buckle.

FIG. 2 shows that the display unit 151 has a rectangular shape. Unlike the example shown in the drawing, the display unit 151 may have a shape of a polygon (e.g., a triangle, a pentagon, etc.) such as triangle, pentagon or the like or a shape of a circle (e.g., a circle, an oval, etc.) such as a circle, an ellipse or the like.

A watch type terminal is able to detect a rotation on a wrist. For instance, when the watch type terminal is worn in a manner that the display unit 151 is placed on the same side of the back of a hand, if the watch type terminal is rotated in a top or bottom direction of the wrist so that the display unit 151 can face the same side of the flat of the hand, the sensing unit of the watch type terminal can generate a sensing signal of detecting the rotation of the top or bottom direction of the wrist.

While the mobile terminal is fixed, if the wrist having the mobile terminal worn thereon is rotated, the controller 180 may determine that the mobile terminal is rotated on the wrist.

In this case, the watch type terminal according to the present invention may have a bangle configuration that facilitates a rotation on a wrist.

Figure 3A:
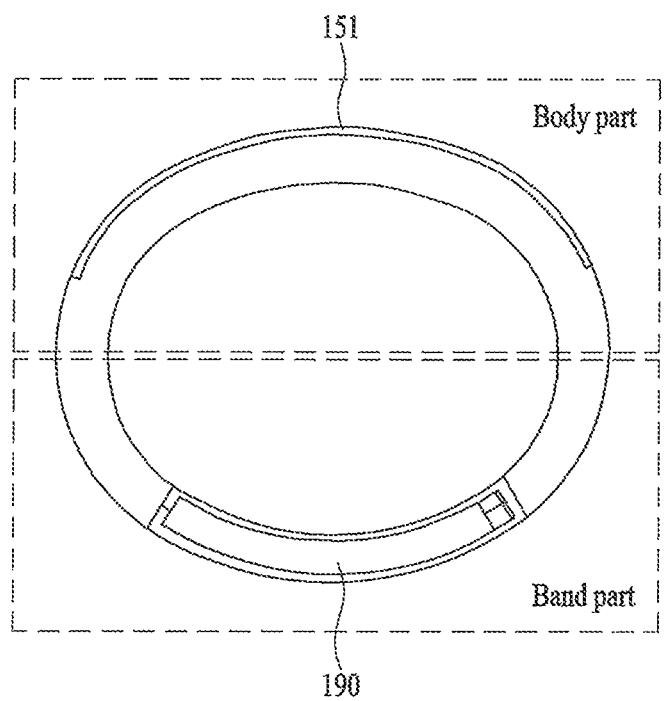
FIGS. 3A, 3B and 3C are diagrams of a watch type terminal in a bangle shape.
Figure 3B:
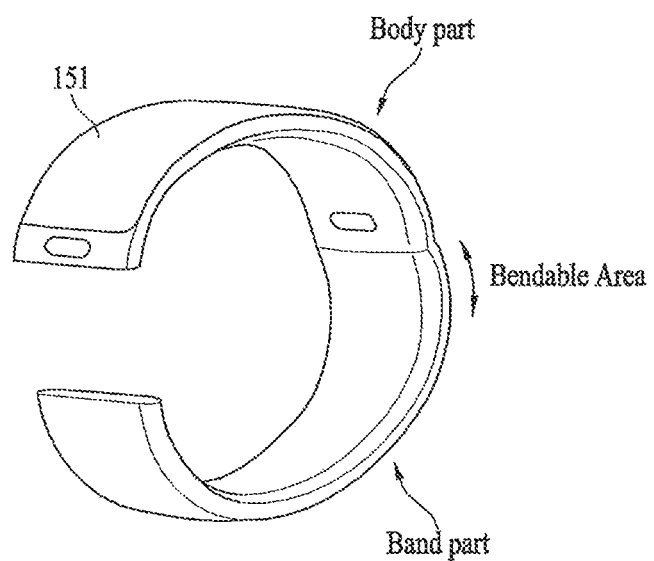
Figure 3C:
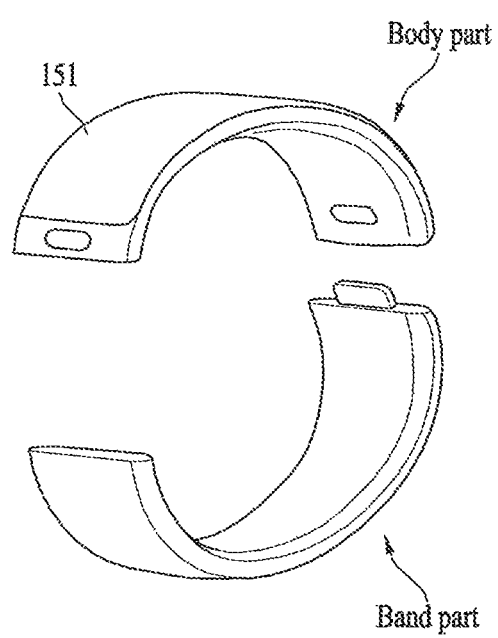

For instance, FIGS. 3A, 3B, and 3C are diagrams of a watch type terminal in a bangle shape. In a general watch type terminal, a length of a band wound on a wrist can be adjusted using a buckle, a button, a magnet or the like. On the other hand, a watch type terminal in a bangle shape may include a band part and a body part separable from each other instead of having a band of a fixed length.

FIG. 3A shows a state that the body part and the band part are coupled with each other. FIG. 3B and FIG. 3C show a state that the body part and the band part are separated from each other.

When the body part and the band part are separated from each other, a user places a wrist between the body part and the band part and then couples the body part and the band part, thereby wearing the watch type terminal in the bangle shape. Unlike a general watch type terminal, since a length of a band of the watch type terminal in the bangle shape is not adjustable to fit a circumference of a wrist, the watch type terminal in the bangle shape may be freely rotated on the wrist.

The watch type terminal can operate in portrait or landscape mode.

Figure 4A:
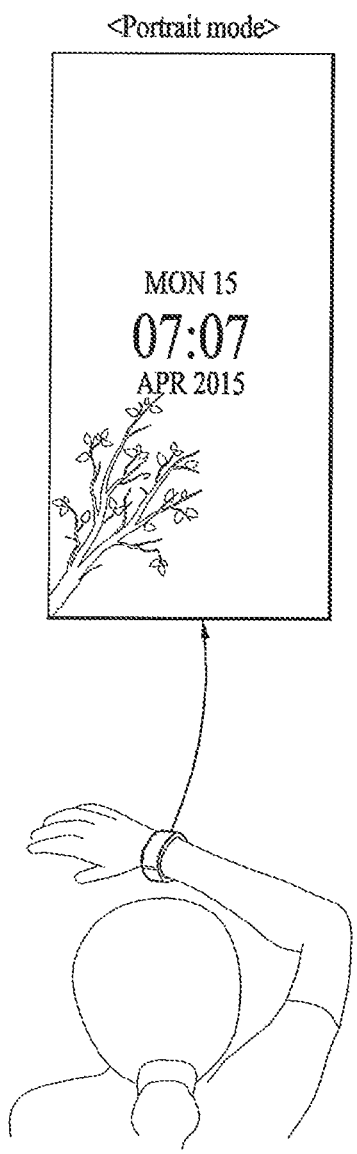

For instance, FIGS. 4A and 4B are diagrams to describe a portrait mode and a landscape mode of a watch type terminal.

Referring to FIG. 4A, as an arm having the watch type terminal worn thereon is folded, if a user is in a state capable of watching a front side of the watch type terminal, a mode of the display unit 151 of the watch type terminal can be set to a portrait mode.

On the other hand, Referring to FIG. 4B, as an arm having the watch type terminal worn thereon is unfolded, if a user is in a state capable of watching a lateral side of the watch type terminal, a mode of the display unit 151 of the watch type terminal can be set to a landscape mode.

If a rotation of the terminal is detected through the sensing unit, the controller 180 of the watch type terminal can switch between the portrait mode and the landscape mode.

Based on the above descriptions, the mobile terminal according to the present invention is described in detail as follows. For clarity of the following description, like the examples shown in FIG. 2 and FIGS. 3A-3C, assume that the mobile terminal according to the present invention may include the watch type terminal. In the following drawings, for clarity, the watch type terminal may be illustrated in a bangle shape, by which a shape of the watch type terminal is non-limited.

Moreover, assume that the watch type terminal according to the present invention includes at least one of the components shown in FIGS. 1A to 1C. For instance, the watch type terminal according to the present invention may be assumed as including the wireless communication unit 110, the microphone 122, the sensing unit 140, the display unit 151, the memory 160 and the controller 180 among the components shown in FIGS. 1A to 1C.

In the following description, a mobile terminal according to the present invention is explained in detail with reference to the accompanying drawings.

FIG. 5 is a flowchart for an operation of a mobile terminal according to the present invention.

Referring to FIG. 5, a mode of the mobile terminal is assumed as set to a landscape mode initially.

If the mode of the mobile terminal is set to the landscape mode [S510], the controller 180 can control an object corresponding to an event or a currently running content information to be outputted through the display unit 151 [S520]. In this case, the event may include one of a reception of such a content as a text message, an instant message, an email or the like, an occurrence of a missed call, a reception of a push message through an application, an occurrence of a warning situation, and the like. In this case, the warning situation may include such an incident necessary to give a warning as a case that a remaining battery level becomes equal to or lower than a preset value, a case that a remaining storage space of the memory 170 becomes equal to smaller than a preset value, a case that a data network use quantity through the mobile terminal exceeds a preset value, or the like.

A type of an event occurring in the mobile terminal can be identified through an object. For the identification of the event type, the object may contain an image object such as an icon or the like, a text indicating a name of an event, and the like. For instance, a text message icon or a text such as 'message' may be used as an object indicating that a text message is received by a mobile terminal. A missed call icon or a text such as 'missed call' may be used as an object indicating that a missed call occurs in a mobile terminal.

A content may include a playable multimedia file (e.g., music, video, etc.), a document file, or the like. Content information may include a cover image of a currently played music, a song information (e.g., information on a song title, an album title, a singer, or the like), a thumbnail image of a video, an information on a video (e.g., a name of a video file), a preview image of a document, and the like.

One example of outputting an object or a content information through a mobile terminal is described in detail with reference to the accompanying drawing as follows.

Figure 6A:
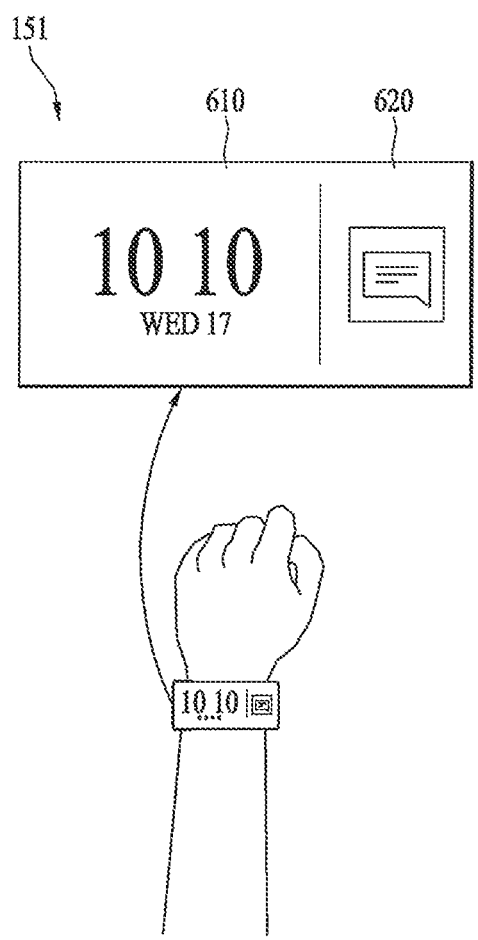
FIGS. 6A and 6B are diagrams for one example of outputting an object corresponding to an event through a mobile terminal.
Figure 6B:
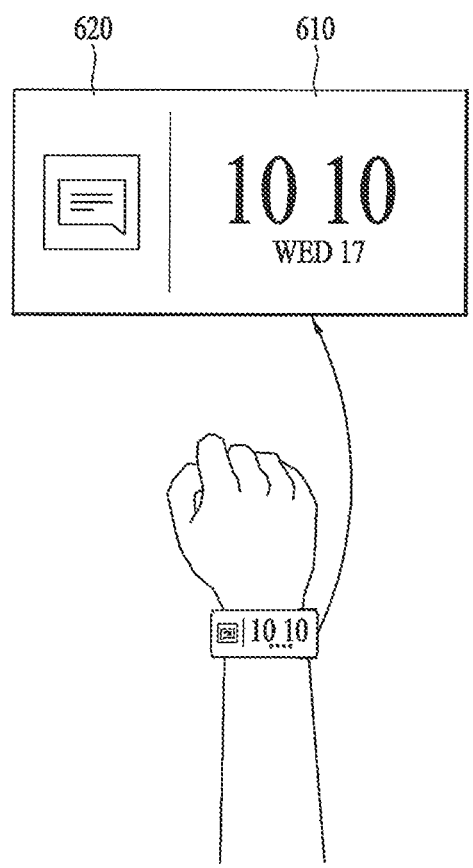

FIGS. 6A and 6B are diagrams for one example of outputting an object corresponding to an event through the mobile terminal.

Referring to FIGS. 6A and 6B, when the display unit 151 is in landscape mode, the controller 180 can control an object, which corresponds to an event, or an object, which indicates an operating status of an application, to be outputted through the display unit 151. For instance, as shown in FIG. 6A, the controller 180 can control a time information 610 and an object 620 corresponding to an event to be outputted through the display unit 151. According to the example shown in FIG. 6A, the time information 610 (e.g., a current time and date) is outputted through the display unit 151, while the object 620 indicating that a text message is received is outputted to one side of the display unit 151.

In doing so, the controller 180 can adjust an output location of the object 620 in accordance with an arm on which the watch type terminal is worn. In particular, if the display unit 151 in landscape mode is divided into two parts by a virtual line, the controller 180 can control the object 620 to be outputted to a region opposite to the mobile terminal worn arm.

For instance, referring to FIG. 6A, if the watch type terminal is worn on a user's left arm, the object 620 can be outputted to a right side of the display unit 151.

On the other hand, referring to FIG. 6B, if the watch type terminal is worn on a user's right arm, the object 620 can be outputted to a left side of the display unit 151.

Like the examples shown in the drawings, the controller 180 can control the object 620 to be outputted to the right/left of the display unit 151 next to a radius side of a wrist, and more particularly, to a side opposing a user's body on angling the wrist.

When the display unit 151 is in a curved shape that encloses the wrist, if the object 620 is displayed toward the user's body, it may increase a user's recognition rate of the object 620. For instance, when a user straightens his hand, a radius side (i.e., an inner body side) of a wrist may have an eyes distance closer than that of an ulna side (i.e., an outer body side) of the wrist. Hence, while a user straightens his wrist, if the object 620 is displayed on the right or left side of the display unit 151 closer to the inner body side, the user's recognition rate of the object 620 may be raised.

Moreover, as the object 620 is restricted from being displayed toward the outer body side, it may bring an effect that a third party's recognition rate of the object 620 is lowered. For instance, while a user stretches out his hand, an eyes distance of a third party around the user from a radius side (i.e., an inner body side) of a user's wrist may be shorter than an eyes distance of the third party around the user from an ulna side (i.e., an outer body side) of the user's wrist. Moreover, if the display unit 151 is in a curved shape enclosing the wrist, it may be more difficult for the third party to watch the display unit 151 on the radius side of the user's wrist. Hence, while the user straightens his wrist, if the object 620 is displayed on the left/right side of the display unit 151 closer to the inner body side, a fact of an occurrence of an event (e.g., a text message, an email, etc.) related to a privacy can be effectively prevented from being provided to a third party.

Moreover, as the object 620 is displayed on the side closer to the inner body side, the user can touch the object 620 easily and conveniently with a hand on which the mobile terminal is not worn. For instance, while a user wears the watch type terminal in a manner that the display unit 151 of the watch type terminal faces the back of the user's hand, if the object 620 is displayed on the right side of the watch type terminal (i.e., the inner body side), it may be easier for the user to touch the object 620 with a right hand.

Besides, if a plurality of events exist, the controller 180 can control a plurality of objects, which respectively correspond to a plurality of the events, to be outputted through the display unit 151.

Figure 7A:
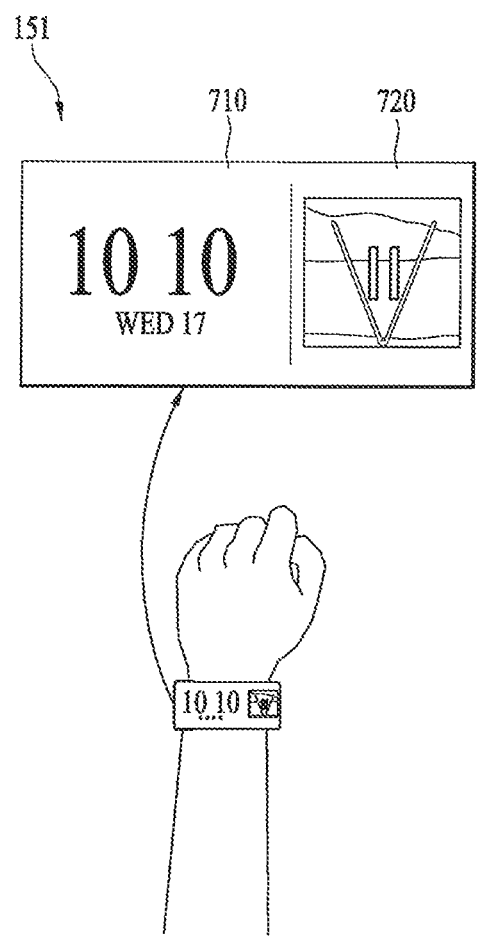
FIGS. 7A and 7B are diagrams for one example of outputting content information through a mobile terminal.
Figure 7B:
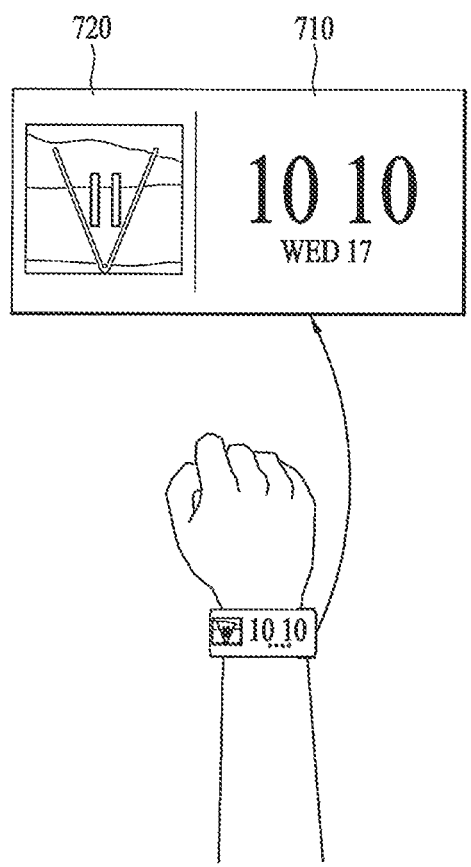

FIGS. 7A and 7B are diagrams for one example of outputting content information through the mobile terminal.

Referring to FIGS. 7A and 7B, when the display unit 151 is in landscape mode, the controller 180 can control a content information 720 to be outputted through the display unit 151. For instance, as shown in FIG. 7A, the controller 180 can control a time information 710 and a content information 720 to be outputted through the display unit 151. According to the example shown in FIG. 7A, the time information 710 is outputted through the display unit 151, while an album art image related to a music file currently played in the mobile terminal to one side of the display unit 151.

If a touch input of touching the content information 720 outputted through the display unit 151 is received, the controller 180 can change a play status of a content. For instance, while a music file is played, if a touch input of touching the album art image is received, the controller 180 can pause the play of the music file. While the play of the music file is paused, if a touch input of touching the album art image is received, the controller 180 may resume the play of the music file.

The controller 180 can adjust an output location of the content information 720 in accordance with an arm having the watch type terminal worn thereon. For instance, if the watch type terminal is worn of a user's left arm, as shown in FIG. 7A, the content information 720 may be outputted to a right side of the display unit 151. For another instance, if the watch type terminal is worn of a user's right arm, as shown in FIG. 7B, the content information 720 may be outputted to a left side of the display unit 151.

While the mode of the mobile terminal is set to the landscape mode, if a movement for switching the mobile terminal to a portrait mode is detected [S530], the controller 180 can control the display unit 151 to be switched to the portrait mode [S540]. When the controller 180 sets the mode of the display unit 151 to the portrait mode, the controller 180 may control a detailed information of the event or a control screen for a content control to be outputted [S550]. In doing so, the controller 180 may output a feedback that indicates that the detailed information of the event or the control screen is outputted. In this case, a type of the feedback may include at least one type selected from sound, vibration and light (e.g., flickering of LED).

The detailed information of the event may include details of a text message, details of an instant message, details of an email, a chat window with a specific person based on a text message or an instant message, detailed information (e.g., a name of the person, a phone number of the person, a profile photo of the person, etc.) on a person having made a missed call, details of a push message, and details (e.g., a message indicating that a remaining battery level becomes equal to or lower than a preset value, a message indicating that a remaining storage space of the memory 170 becomes equal to smaller than a preset value, a message indicating that a data network use quantity through the mobile terminal exceeds a preset value, etc.) of a warning situation.

The control screen of the content may include one of a music play screen, a video play screen, a document file editing screen, and the like. Through the music/video play screen, a play status of a music/video file can be adjusted. Through the document file editing screen, an operation (e.g., insertion, modification, etc.) of editing a document file can be performed.

One example of outputting detailed information of an event or detailed information of a content through the mobile terminal is described in detail with reference to the accompanying drawing as follows.

Figure 8A:
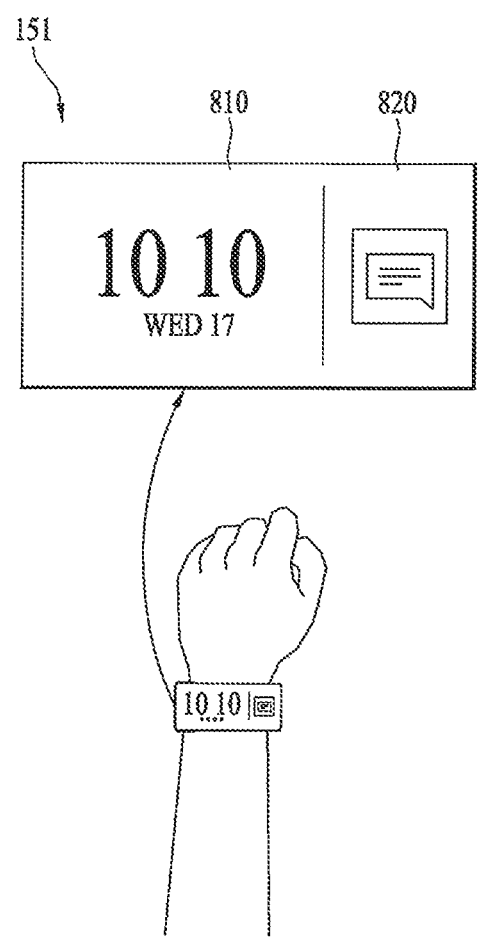
FIGS. 8A and 8B are diagrams for one example of outputting a detailed information of an event.
Figure 8B:
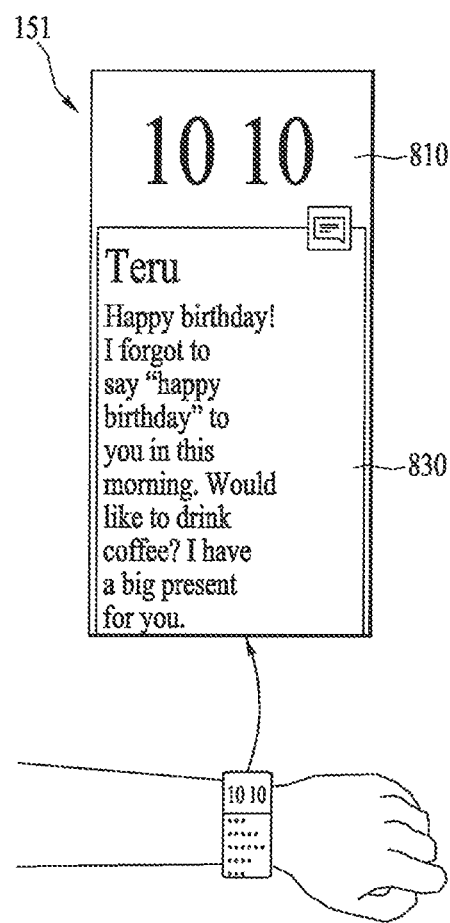

FIGS. 8A and 8B are diagrams for one example of outputting a detailed information of an event.

Referring to FIG. 8A, if a mode of the mobile terminal is set to a landscape mode, the controller 180 can output an object 820 corresponding to an event. In doing so, the controller 180 can apply a horizontal layout in which informations (i.e., a time information 810 and an object 820) outputted through the display unit 151 are disposed horizontally.

While the mode of the mobile terminal is set to the landscape mode, if a prescribed gesture is inputted, as shown in FIG. 8B, the controller 180 sets the mode of the mobile terminal to a portrait mode and controls a detailed information 830 of the event to be outputted. According to the example shown in FIG. 8B, details of a message are outputted through the display unit 151 together with the time information 810.

Moreover, if the mode of the mobile terminal is set to the portrait mode, the controller 180 can control a vertical layout, in which the informations (i.e., the time information 810 and the detailed information 830 of the event) outputted through the display unit 151 are disposed vertically, to be applied.

In doing so, if an arm having the mobile terminal worn thereon is folded toward an inner body side, it may be more difficult for a third party to watch a bottom side of the display unit 151 than to watch a top side of the display unit 151. Hence, the controller 180 can configure a vertical layout in a manner of disposing the time information 810 and the detailed information 830 of the event to the top side and the bottom side of the display unit 151, respectively.

If the sensing unit 140 including an acceleration sensor, a gyro sensor and the like detects that an arm having the mobile terminal worn thereon is rotated over a prescribed angle with a prescribed radius (e.g., a gesture of straightening a folded arm, a gesture of folding a straightened arm, etc.) or that the mobile terminal has moved over a prescribed distance, the controller 180 can determine that a gesture for a switch between the portrait mode and the landscape mode is inputted. In doing so, in order to prevent frequent switches between the portrait mode and the landscape mode, the controller can control the inter-mode switch not to occur even if a gesture for the mode switch is detected in a prescribed time after the occurrence of the inter-mode switch. For another instance, while an arm is being folded or unfolded, if a moving speed of the mobile terminal is equal to or greater than a first reference value and/or equal to or smaller than a second reference value, the controller 180 can control the inter-mode switch to occur.

If the object 820 outputted in the landscape mode indicates an occurrence of a missed call, a reception of a push message, an occurrence of a warning situation or the like, the detailed information 830 outputted in the portrait mode may include a detailed information 830 on a person having made the missed call, details of the push message, details of the warning situation or the like.

If a plurality of objects 820 are outputted in the landscape mode, when the mobile terminal is switched to the portrait mode, the controller 180 outputs the detailed information 830 of each of a plurality of events or the detailed information 830 of a prescribed one of a plurality of the events (e.g., an event having a most recently occurring time) only.

According to the example shown in FIGS. 8A and 8B, the controller 180 may control a prescribed quantity of information to be outputted through the display unit 151. For instance, if a quantity of a text message is smaller than a prescribed quantity, a whole content of the text message may be outputted through the display unit 151. Yet, if a quantity of a text message is greater than a prescribed quantity, a prescribed portion of the text message may be outputted through the display unit 151 only. In case that a prescribed portion of a detailed information is outputted, the detailed information may be scrolled by a user input.

Figure 9A:
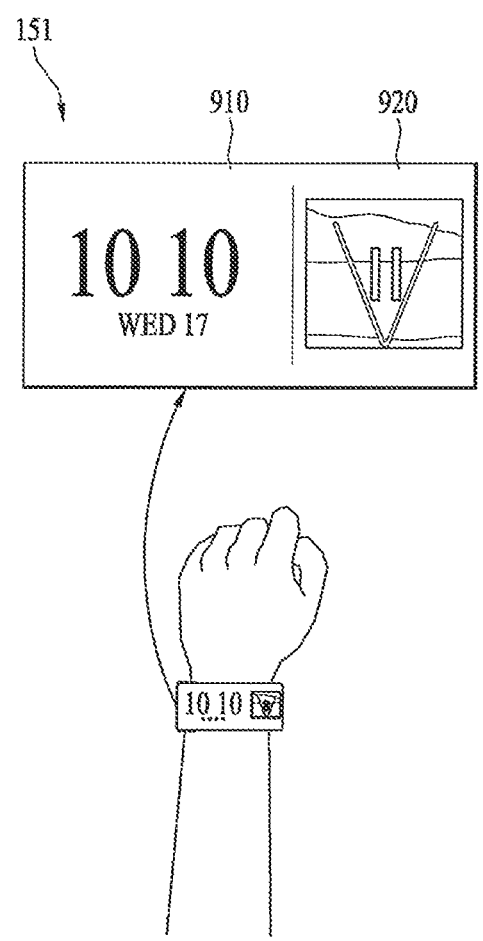
FIGS. 9A and 9B are diagrams for one example of outputting a control screen of a content.
Figure 9B:
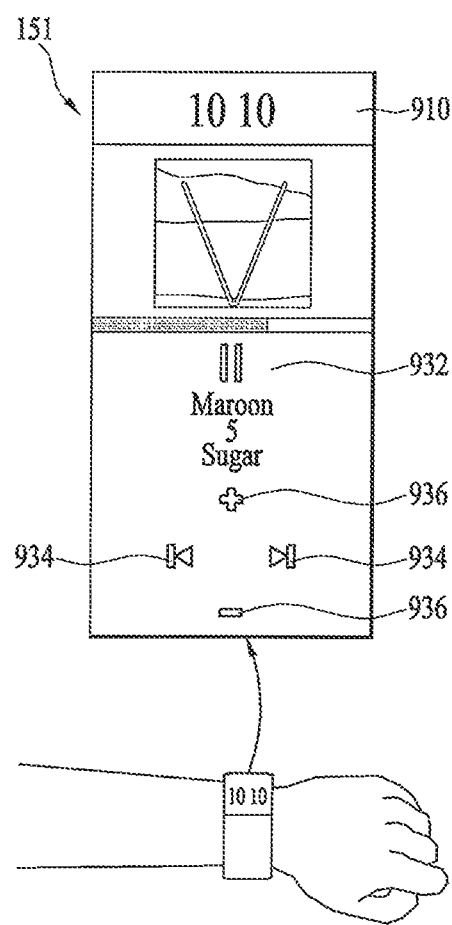

FIGS. 9A and 9B are diagrams for one example of outputting a control screen of a content.

Referring to FIG. 9A, if a mode of the mobile terminal is set to a landscape mode, the controller 180 can output a currently played content information 920. In doing so, the controller 180 can apply a horizontal layout in which informations (i.e., a time information 910 and a content information 920) outputted through the display unit 151 are disposed horizontally.

While the mode of the mobile terminal is set to the landscape mode, if a prescribed gesture is inputted, the controller 180 sets the mode of the mobile terminal to a portrait mode and controls a control screen of a content to be outputted. According to the example shown in FIG. 9B, a music play screen is outputted. In the music play screen shown in FIGS. 9A and 9B, a button 932 for a play control of a music file, a pair of search buttons 934 for searching music files, and a pair of volume buttons 936 for volume adjustments are included as well as the information (e.g., an album art, a singer, a song title, etc.) of a currently played music file.

In doing so, the controller 180 can control a vertical layout, in which items on the music play screen are arranged vertically, to be applied.

According to the example described with reference to FIG. 5, the mobile terminal is switched to the portrait mode from the landscape mode. On the contrary, if the mobile terminal is switched to the landscape mode from the portrait mode, the detailed information of the event or the content control screen stops being outputted and an object corresponding to an event or a content information may be outputted.

Although the mode of the mobile terminal is set to the landscape mode, if a user input of touching an object or a content information is received, the controller 180 may output a detailed information of an event or a content control screen.

FIG. 8A through FIG. 9B show that the time information is outputted together with the detailed information of the event or the control screen. In doing so, the controller 180 can adjust a size occupied by the time information in accordance with an output quantity of the detailed information of the event or an output quantity of the control screen.

Figure 10A:
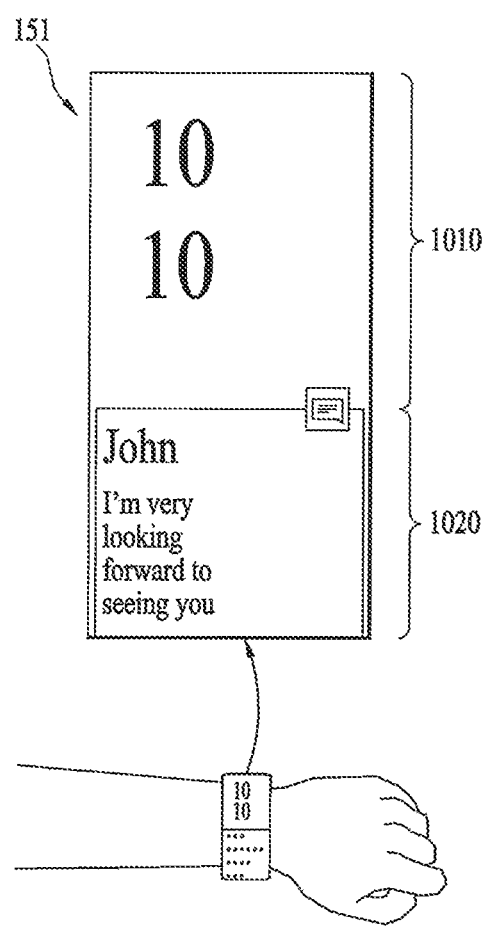
FIGS. 10A and 10B are diagrams for one example of adjusting a size occupied by a time information in accordance with a detailed quantity of an event.
Figure 10B:
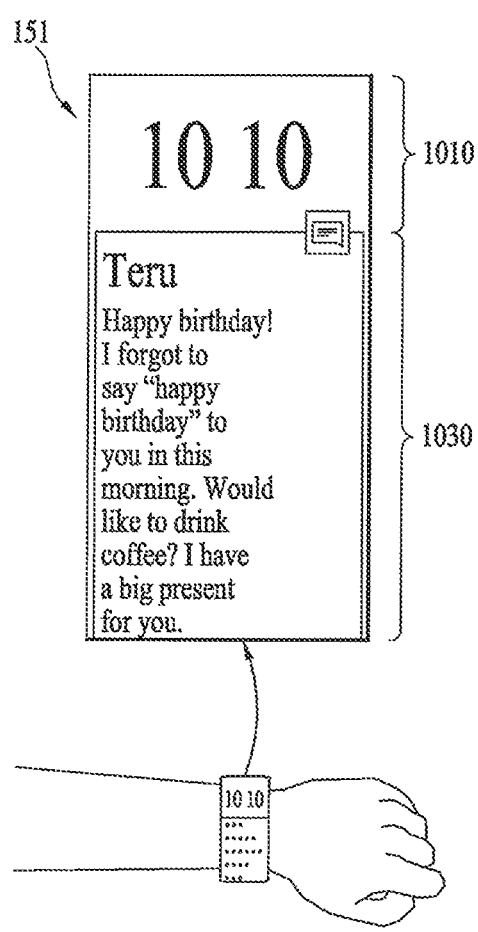

For instance, FIGS. 10A and 10B are diagrams for one example of adjusting a size occupied by a time information in accordance with a detailed quantity of an event.

Referring to FIG. 10A and FIG. 10B, a quantity of a text message 1030 shown in FIG. 10B is greater than that of a text message 1020 shown in FIG. 10A. Hence, a time information 1010 shown in FIG. 10A may have a size greater than that of a time information 1010 shown in FIG. 10B.

Yet, it is not necessary for the time information to be outputted together with the detailed information of the event or the control screen of the content. When the detailed information of the event or the control screen of the content is outputted, it may be able to skip the output of the time information.

In the above drawings, the display unit 151 has a rectangular shape in which one of a width side and a length side of the display unit 151 is longer than the other. Without being limited by the examples shown in the above drawings, the aforementioned embodiments are also applicable to a case that the display unit 151 is in a circular shape, a square shape, or one of other polygonal shapes.

For instance, FIG. 11A through FIG. 12B are diagrams for one example of outputting a detailed information of an event or a control screen of a content in case of a display unit in a circular shape.

Figure 11A:
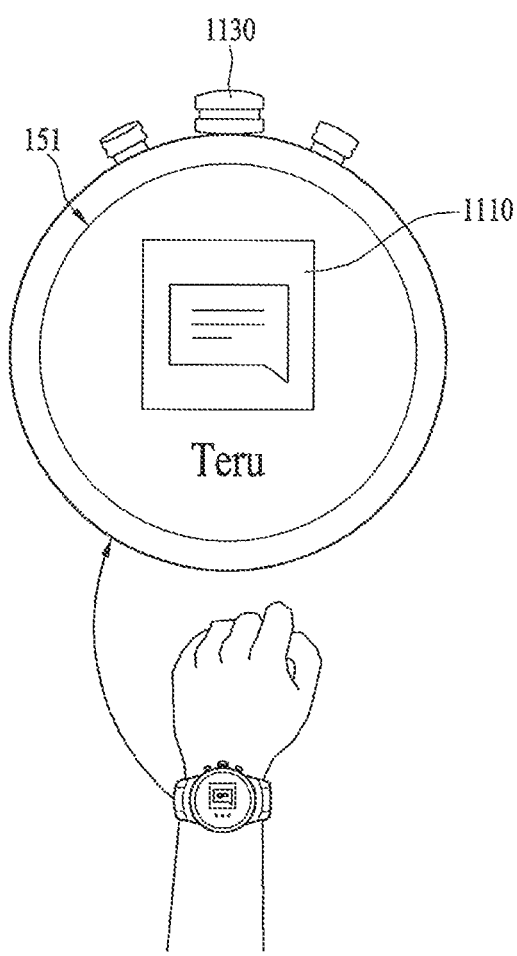
FIGS. 11A, 11B, 12A and 12B are diagrams for one example of outputting a detailed information of an event or a control screen of a content in case of a display unit in a circular shape.

Referring to FIG. 11A, if a mode of the mobile terminal is set to a landscape mode, the controller 180 can output an object 1110 corresponding to an event. FIG. 11A shows that the object 1110 indicating that a text message is received is outputted. If a button 1130 in a crown shape is provided to a lateral side of the watch type terminal, the object 1110 may be disposed in a manner that the button 1130 in the crown shape faces in a top (or bottom) direction.

Figure 11B:
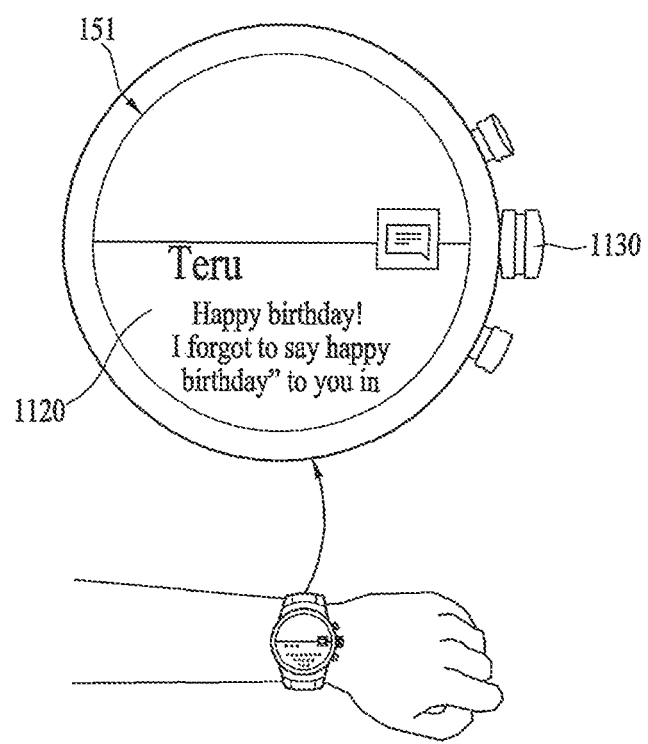

While the mode of the mobile terminal is set to the landscape mode, if a prescribed gesture is inputted, as shown in FIG. 11B, the controller 180 sets the mode of the mobile terminal to a portrait mode and controls a detailed information 1120 of the event to be outputted. According to the example shown in FIG. 11B, details of a text message are outputted together with a text message icon. If a button 1130 in a crown shape is provided to a lateral side of the watch type terminal, the detailed information 1120 of the event may be disposed in a manner that the button 1130 in the crown shape faces in a right (or left) direction.

Figure 12A:
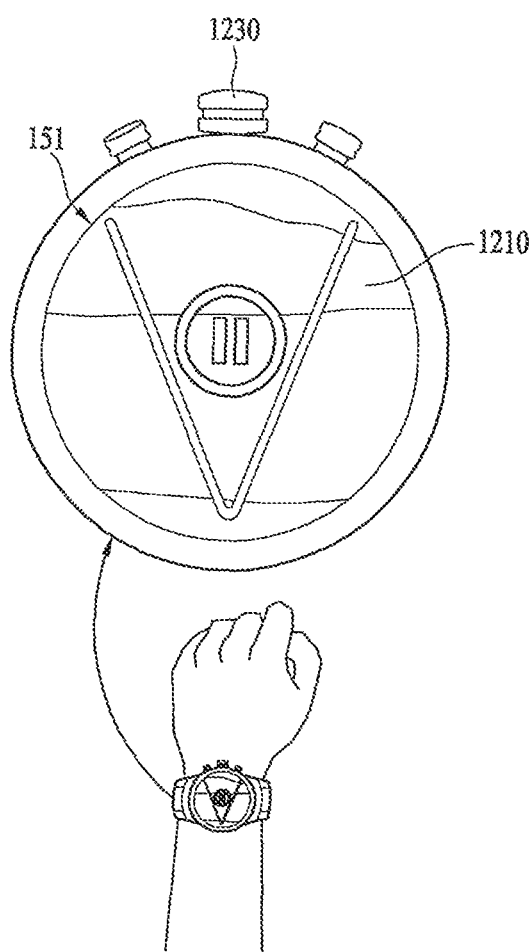

Referring to FIG. 12A, if a mode of the mobile terminal is set to a landscape mode, the controller 180 can control a content information 1210 to be outputted. FIG. 12A shows that an information (e.g., album art) of a currently played music file is outputted. If a user input of touching the outputted content information 1210 is received, the controller 180 can change a play status of the content in a manner of pausing the play of the content, resuming the play of the content, or the like. If a button 1230 in a crown shape is provided to a lateral side of the watch type terminal, the content information 1210 may be disposed in a manner that the button 1230 in the crown shape faces in a top (or bottom) direction.

Figure 12B:
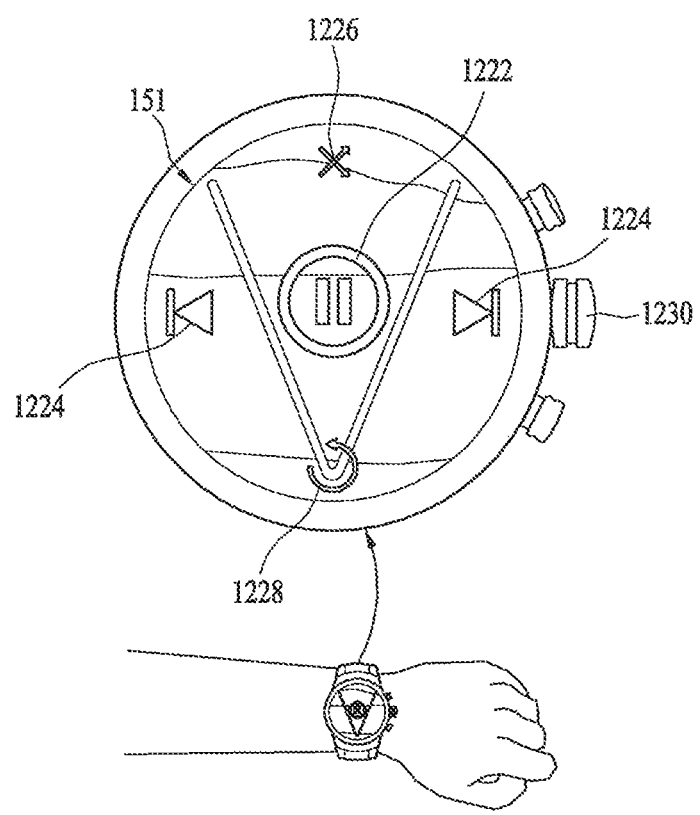

While the mode of the mobile terminal is set to the landscape mode, if a prescribed gesture is inputted, as shown in FIG. 12B, the controller 180 sets the mode of the mobile terminal to a portrait mode and controls a control screen of an event to be outputted. According to the example shown in FIG. 12B, a content control screen including a play button 1222 for changing a play status of the content, a pair of search buttons 1224 for searching music files, a shuffle button 1226 for setting a random play, and a repeat button 1228 for setting a repetitive play is outputted. If a button 1230 in a crown shape is provided to a lateral side of the watch type terminal, the content control screen may be disposed in a manner that the button 1230 in the crown shape faces in a lateral direction (e.g., a left direction, a right direction, etc.).

While a detailed information such as a text message, an instant message, an email or the like is outputted through the display unit 151, if a gesture of lifting the mobile terminal (e.g., a gesture of lifting the mobile toward lips) is received, the controller 180 can enable a state capable of composing a reply message to a person having sent a content. In particular, the controller 180 activates the microphone 122 and is then able to convert the voice inputted through the microphone 122 by STT (Speech to Text). If the user's message input is completed, the controller 180 can send the composed message as a reply.

Figure 13A:
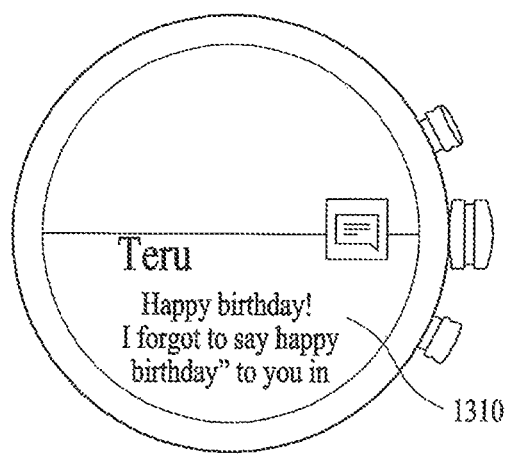
FIGS. 13A and 13B are diagrams for one example of activating a microphone.
Figure 13B:
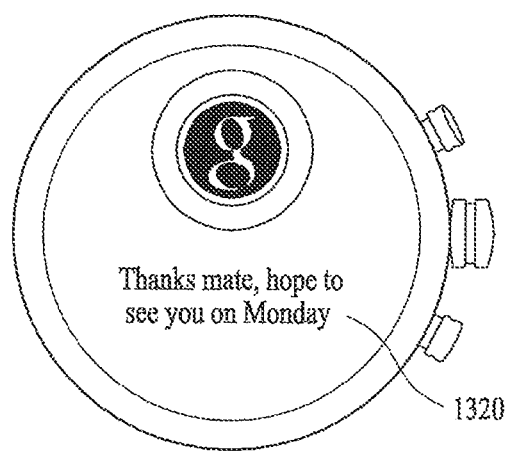

FIGS. 13A and 13B are diagrams for one example of activating a microphone.

Referring to FIG. 13A, as a mode of the mobile terminal is set to a portrait mode, while a detailed information 1310 of a message is being outputted, if a gesture of lifting the mobile terminal is detected, the controller 180 can control the microphone 122 to be activated. If a voice is inputted through the microphone 122, as shown in FIG. 13B, the controller 180 converts the voice inputted to the microphone 122 by STT and is then able to output a converted text 1320 through the display unit 151.

Thereafter, if a gesture of lowering the mobile terminal or a user input of touching a complete button outputted through the display unit 151 is received, the controller 180 can control a message, which uses the converted text as a reply, to be sent.

The controller 180 detects a gesture of unfolding an arm or a gesture of folding a arm through the acceleration sensor, the gyroscope sensor or the like and is then able to set a mode of the display unit 151 to one of the landscape mode and the portrait mode correspondingly.

Yet, it may be difficult to obtain whether the mobile terminal worn arm is in an unfolded state or a folded state initially using the acceleration sensor or the gyroscope sensor only.

Hence, if it is difficult to obtain whether the mobile terminal worn arm is in an unfolded state or a folded state, the controller 180 sets the output mode of the display unit 151 to the display mode set to a default or may control the display unit 151 to maintain the display mode applied right before.

Thereafter, it is unable to adjust the output mode of the display unit 151 in response to a user's gesture until it is clearly detected that a user has unfolded or folded an arm.

If a movement of rotating on a wrist is detected, the mobile terminal according to the present invention may control a detailed information of an event to be outputted. One example of outputting a detailed information of an event in accordance with a rotation of the mobile terminal is described in detail with reference to the accompanying drawing as follows.

Figure 14:
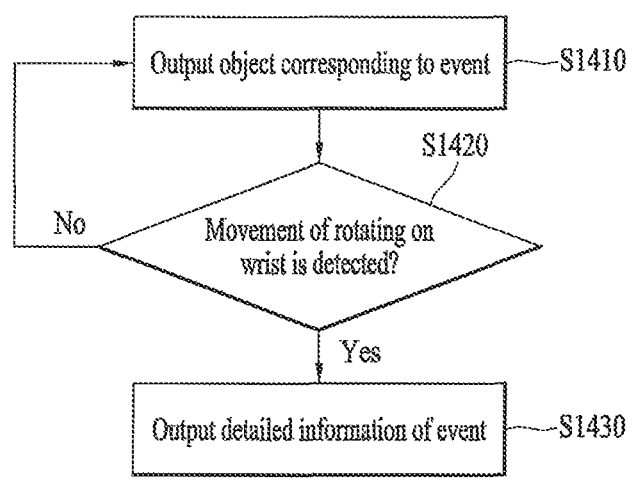
FIG. 14 is a flowchart for an operation of a mobile terminal according to the present invention.

FIG. 14 is a flowchart for an operation of a mobile terminal according to the present invention.

Referring to FIG. 14, assume that the mobile terminal is initially worn in a manner that the display unit 151 faces the same direction of the back of a hand.

First of all, the controller 180 can output an object corresponding to an event through the display unit 151 [S1410]. Thereafter, if a movement of the mobile terminal that rotates on a wrist is detected [S1420], the controller 180 can control a detailed information of the event to be outputted through the display unit 151 [S1430]. If the wrist is rotated only by fixing the mobile terminal, the controller 180 may determine that the mobile terminal rotates on the wrist. Moreover, only if the mobile terminal rotates in a first direction (e.g., in a direction of a radius of the wrist), the controller 180 may control a detailed information of the event to be outputted.

In proportion to a rotation degree of the mobile terminal, the controller 180 may adjust an output quantity of a detailed information. In particular, if the mobile terminal further rotates so that the display unit 151 can face the same side of the flat of the hand from the same side of the back of the hand, the controller 180 can control a more quantity of the detailed information to be outputted.

FIGS. 15A-15D are diagram for one example of outputting a detailed information of an event in response to a rotation of a mobile terminal.

Figure 15A:
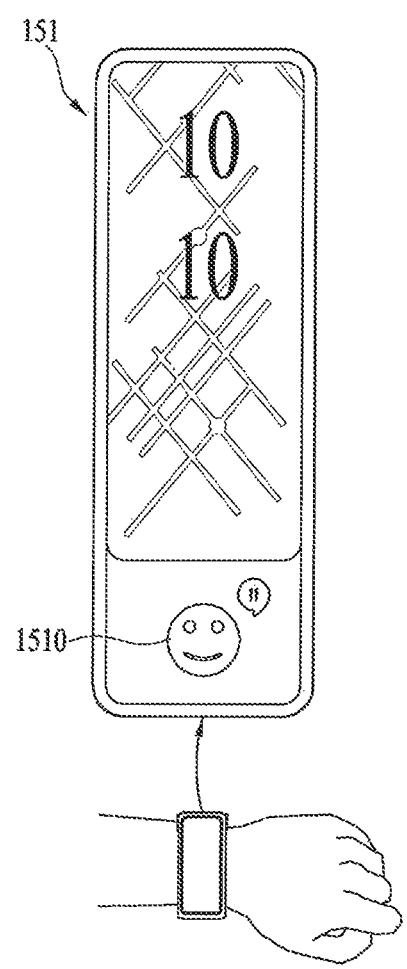
FIGS. 15A, 15B, 15C and 15D are diagrams for one example of outputting a detailed information of an event in response to a rotation of a mobile terminal.
Figure 15B:
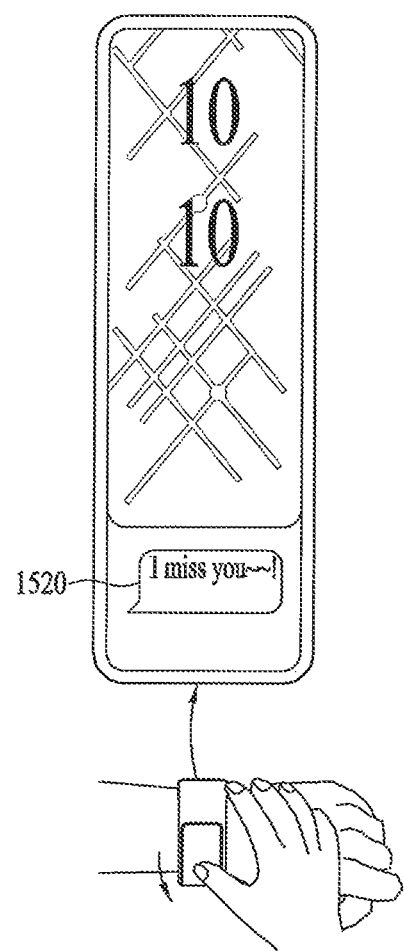
Figure 15C:
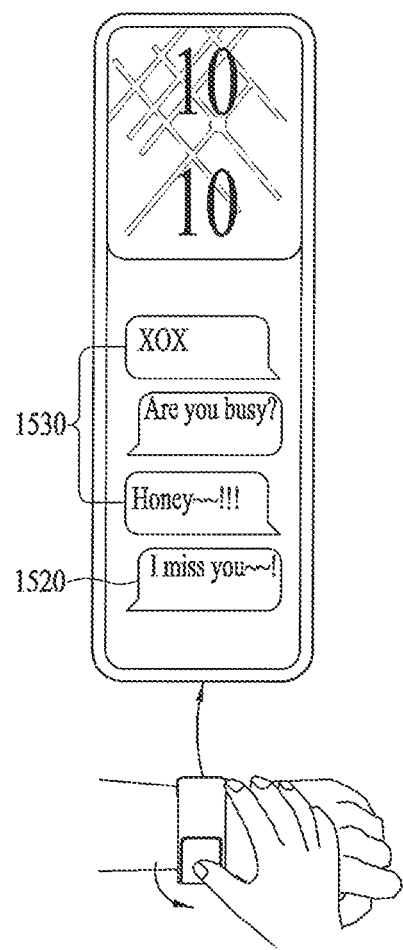

Referring to FIG. 15A, if the display unit 151 is placed toward the back of a hand, the controller 180 can control an object 1510, which indicates that an event has occurred, to be outputted through the display unit 151. According to the example shown in FIG. 15A, outputted is an icon 1510 indicating that a message is newly received.

Thereafter, if the mobile terminal of a wrist having the mobile terminal worn thereon is rotated so that the display unit 151 can face the same side of the flat of the hand, the controller 180 can control a detailed information of the event to be outputted through the display unit 151. According to the example shown in FIG. FIG. 15B, as the display unit 151 is rotated to face the same side of the flat of the hand, details 1520 of the newly received message are outputted through a bottom part of the display unit 151.

In doing so, the controller 180 can control a more quantity of the detailed information to be outputted if the display unit 151 is further rotated toward the same side of the flat of the hand. According to the example shown in FIG. 15C, as the display unit 151 is further rotated to move toward the same side of the flat of the hand, a past chat content 1530 (i.e., past transceived messages) with a person having sent the message is outputted as well. Moreover, as the output quantity of the detailed information of the message increases, a size of the time information decreases.

Figure 15D:
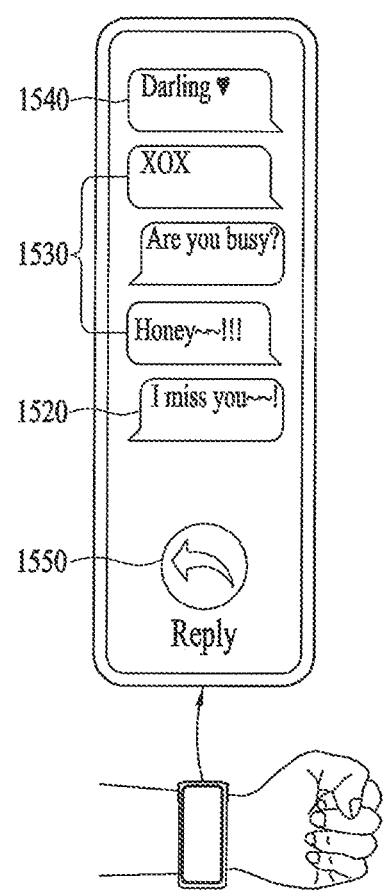

According to the example shown in FIG. 15D, as the display unit 151 is more further rotated toward the same side of the flat of the hand, more past chat contents 1540 are outputted. Moreover, a button 1550 for composing a reply message to the person having sent the message is outputted as well.

If the display unit 151 faces the same side of the back of the hand, it may be easy for a third party to watch the display unit 151. On the contrary, if the display unit 151 is moved toward the same side of the flat of the hand, it may be difficult for a third party to watch the display unit 151. Hence, in case that the display unit 151 faces the same side of the back of the hand, the controller 180 refrains from outputting personal informations such as a detailed information of a message and the like. In case that the display unit 151 faces the same side of the flat of the hand, the controller 180 can output the personal informations such as the detailed information of the message and the like.

In outputting the detailed information of the event, the controller 180 can control the detailed information of the event to be outputted by starting with a region closer to the flat of the hand in the whole region of the display unit 151. For instance, like the example shown in FIGS. 15A-15D, if the mobile terminal is rotated toward a bottom side (i.e., an ulna side), the controller 180 can control the detailed information of the event to be outputted from the bottom side of the display unit 151. According to the example shown in FIGS. 15A-15D, as the detailed information of the event starts to be outputted from the bottom end portion of the display unit 151, if a rotation of the mobile terminal further moves, the detailed information of the event is extensively outputted up to the top end portion of the display unit 151.

Besides, if the mobile terminal or the mobile terminal worn wrist is rotated so that the display unit 151 can face the same side of the back of the hand, the output of the detailed information may be gradually stopped [not shown in the drawing].

In portrait mode, the controller 180 outputs a prescribed quantity of a detailed information of an event. If it is determined that the mobile terminal is rotated over a prescribed reference value, the controller switches the mobile terminal to a landscape mode and is able to control the detailed information of the event to be outputted.

Figure 16A:
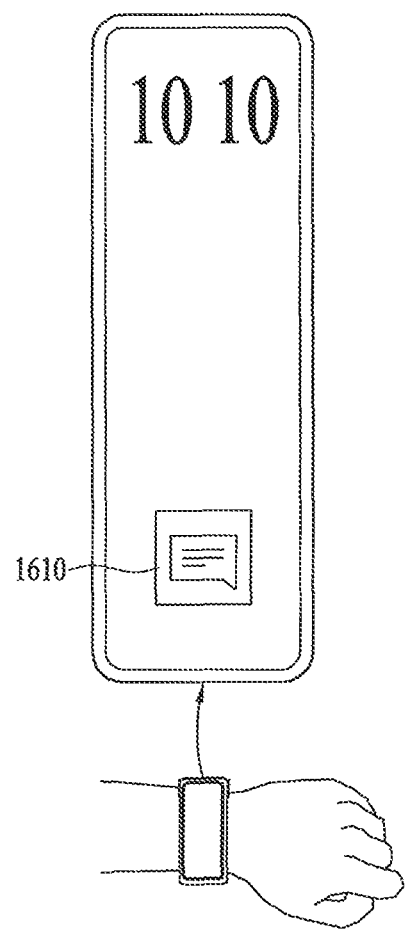
FIGS. 16A, 16B and 16C are diagrams for one example of outputting a detailed information of an event in response to a change of an output mode of a mobile terminal.
Figure 16B:
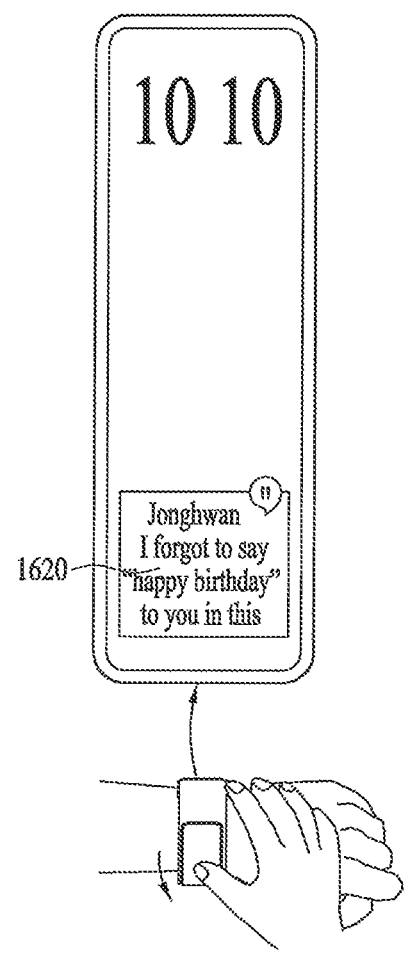
Figure 16C:
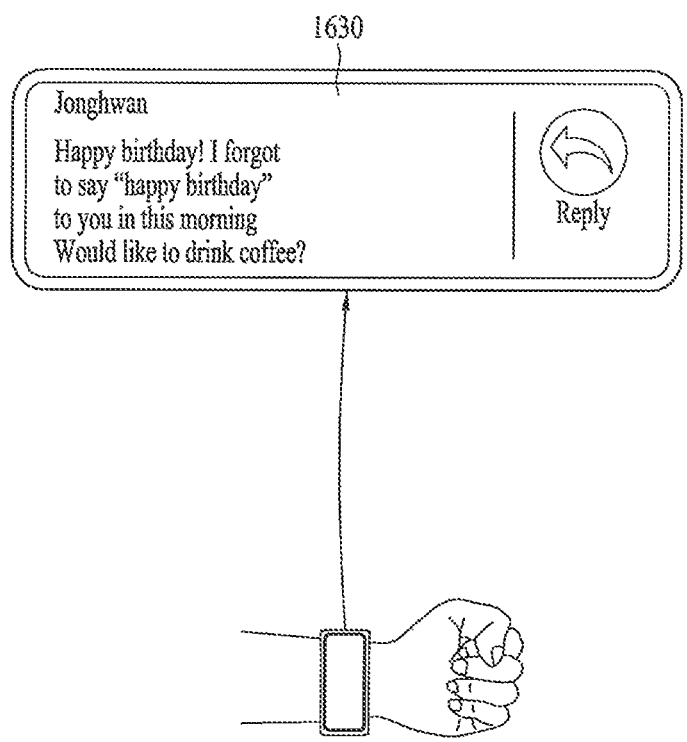

For instance, FIGS. 16A-16C are diagrams for one example of outputting a detailed information of an event in response to a change of an output mode of a mobile terminal.

Referring to FIG. 16A, in case that the display unit 151 set in portrait mode is placed to face the same side of the back of a hand, the controller 180 can control an object 1610, which indicates that an event has occurred, to be outputted through the display unit 151. According to the example shown in FIG. 16A, a time information and an icon 1610, which indicates that a message is newly received' are outputted in a manner of being arranged vertically.

Thereafter, if the mobile terminal or the mobile terminal worn wrist is rotated so that the display unit 151 can face toward the same side of the flat of the hand, the controller 180 can control a prescribed quantity of a detailed information of the event to be outputted through the display unit 151. According to the example shown in FIG. 16B, as the display unit 151 is rotated to face the same side of the flat of the hand, a partial quantity 1620 of a newly received message is outputted through a bottom end portion of the display unit 151.

As the mobile terminal or the mobile terminal worn wrist is further rotated so that the display unit 151 can face the same side of the flat of the hand, referring to FIG. 16C, the controller 180 switches the display unit 151 to the landscape mode and is able to control a more quantity of the detailed information 1630 to be outputted.

As the display unit 151 is switched to the landscape mode, user's readability on the detailed information of the event can be improved.

Besides, if the mobile terminal or the mobile terminal worn wrist is rotated so that the display unit 151 can face toward the same side of the flat of the hand again, the controller 180 switches the display unit 151 to the portrait mode and is also able to gradually stop outputting the detailed information of the event [not shown in the drawing].

The combination of the embodiments described with reference to FIG. 5 and FIG. 14 may be applicable to the mobile terminal. For instance, if the display unit 151 is switched to the portrait mode from the landscape mode, the controller 180 controls a prescribed quantity of the detailed information of the event to be outputted. In doing so, if the mobile terminal is rotated on the wrist, the controller 180 can control more quantity of the information to be outputted.

According to the examples shown in FIG. 5 and FIG. 14, if the mobile terminal is switched to the landscape mode from the portrait mode or it is detected that the mobile terminal is rotated to move on the wrist, the detailed information of the event is outputted.

For another instance, in case of receiving a prescribed user input, the controller 180 may control a detailed information of an event to be outputted.

Figure 17A:
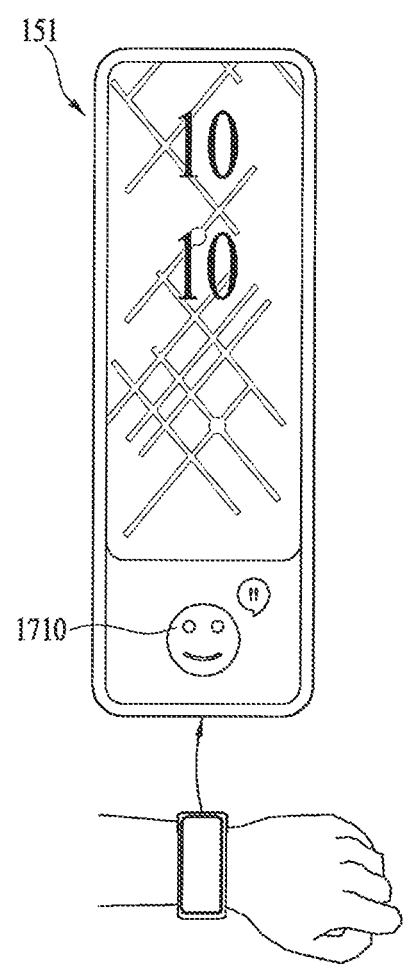
FIGS. 17A and 17B are diagrams for another example of outputting a detailed information of an event.
Figure 17B:
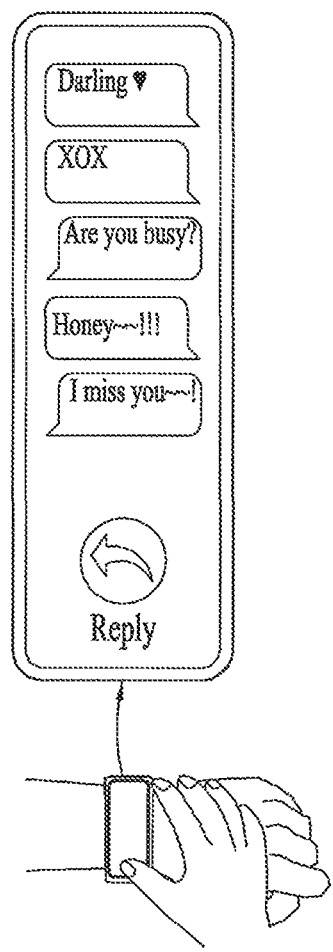

For instance, FIGS. 17A and 17B are diagrams for another example of outputting a detailed information of an event.

Referring to FIGS. 17A and 17B, if an event occurs, the controller 180 can output an object 1710, which indicates that the event has occurred, through the display unit 151. According to the example shown in FIG. 17A, a time information and an object 1710, which indicates that a message has been received, are outputted together.

While the object 1710 is outputted, if a prescribed touch input is received, the controller 180 can control a detailed information of the event to be outputted through the display unit 151. For example, if a touch input of touching the object is received or a touch input of touching both end portions (e.g., top and bottom end edges of the display unit 151) of the display unit 151 is received [FIG. 17A], the controller 180 can control the detailed information of the event to be outputted [FIG. 17B]. According to the example shown in FIG. 17B, a chat window with a counterpart having sent a message is outputted.

In doing so, only if a prescribed touch input is maintained, the controller 180 can control the detailed information of the event to be outputted. For instance, if one of two pointers currently touching both of the end portions of the display unit 151 or both of the two pointers are released from the display unit 151, the output of the detailed information of the event may be stopped.

If details of a content such as an instant message, an email or the like are confirmed, the controller 180 can send an information, which indicates that the content has been confirmed, to a person having sent the content. Hence, the person having sent the content may be able to check whether a user of the mobile terminal has confirmed the content.

Yet, in case that the details of the content are displayed by touching the display unit 151, the controller 180 may not send the information indicating that the content has been confirmed. Hence, although the user has confirmed the details of the content by touching the display unit 151, the person having sent the content may not be aware whether the user has confirmed the content.

While an object or a content information is not displayed, if the mobile terminal is switched to the landscape mode from the portrait mode or a movement of rotation on a wrist is detected, the controller 180 can control a content, which is received from a feed server configured to distribute contents, to be further displayed in addition to a time information.

Figure 18A:
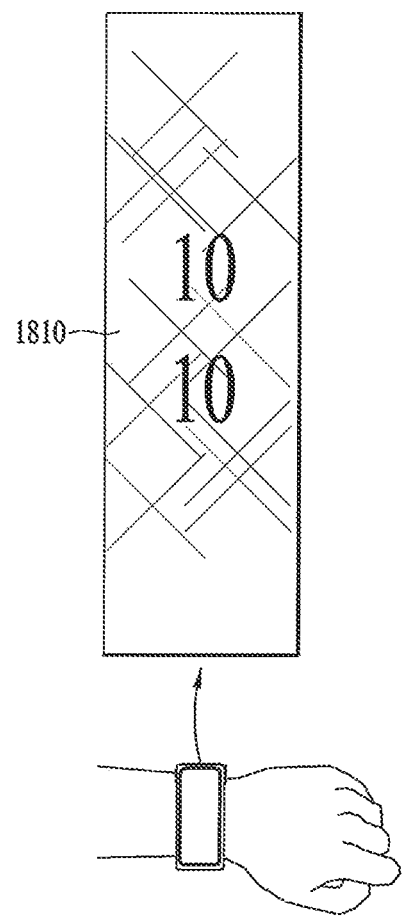

For instance, FIGS. 18A and 18B are diagrams for one example of displaying a content received from a feed server.

Referring to FIG. 18A, if the display unit 151 is placed to face toward the same side of the back of a hand, the controller 180 may control a time information 1810 to be outputted through the display unit 151. If a newly occurring event or a currently played content does not exist, an output of an object or an output of a content information may be skipped.

Thereafter, if the mobile terminal or the mobile terminal worn wrist is rotated so that the display unit 151 can face toward the same side of the flat of the hand, the controller 180 receives a content from a feed server and is then able to control the received content to be outputted.

In this case, the contents received from the feed server may include a location information, a weather information, a new content and the like. For instance, according to the example shown in FIG. 18B, as the mobile terminal is rotated, a location information 1820 and a weather information 1830 are further displayed through the display unit 151.

In doing so, the content received from the feed server may be set to flow from one edge of the display unit 151 toward an opposite edge. Hence, although an output quantity of the content is considerably large, a user can check the whole quantity of the content.

According to the example shown in FIGS. 18A and 18B, as the mobile terminal is rotated from a side of the back of a hand toward a side of the flat of the hand, a content received from a feed server is outputted. Moreover, although the mobile terminal is switched to a portrait mode from a landscape mode [cf. FIG. 41], a content received from a feed server can be outputted.

A gesture of rotating the mobile terminal on a wrist may be used to remotely control the mobile terminal. In particular, if a movement of the mobile terminal rotated on the wrist is detected, the controller 180 can process such a command as a setting value change of the mobile terminal, a control operation on a currently played content, an response to an incoming call or the like in response to the detected movement. This is described in detail with reference to the accompanying drawings as follows.

FIG. 19A through FIG. 20C are diagrams for examples of changing a setting value of a mobile terminal by a gesture of rotating a mobile terminal.

Figure 19A:
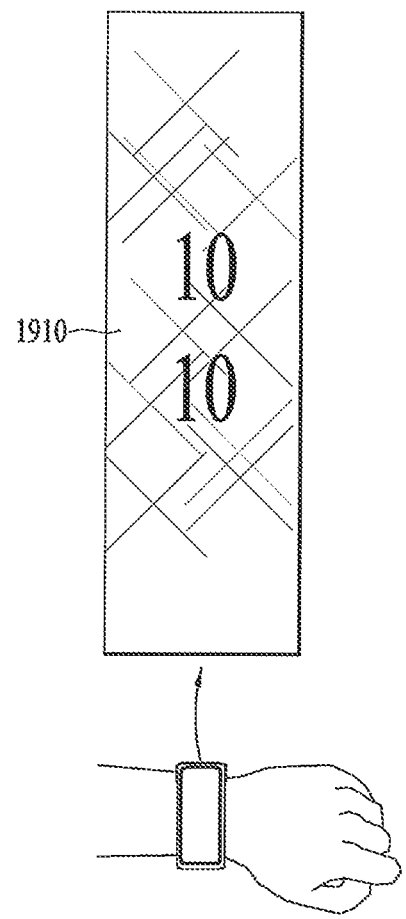
FIGS. 19A, 19B, 19C, 20A, 20B and 20C are diagrams for examples of changing a setting value of a mobile terminal by a gesture of rotating a mobile terminal.

Referring to FIG. 19A, if the display unit 151 of the mobile terminal faces toward the same side of back of a hand, the controller 180 can control a home screen including a time information 1910 to be outputted through the display unit 151.

In doing so, if a movement of rotating the mobile terminal on a wrist in a first direction is detected and it is determined that the mobile terminal has rotated over a prescribed reference value, the controller 180 can control a setting value for an interruption prohibition mode of the mobile terminal to be set to ON state. Moreover, the controller 180 can control an information 1920, which indicates that the interruption prohibition mode is set to ON state, to be outputted through the display unit 151.

Figure 19B:
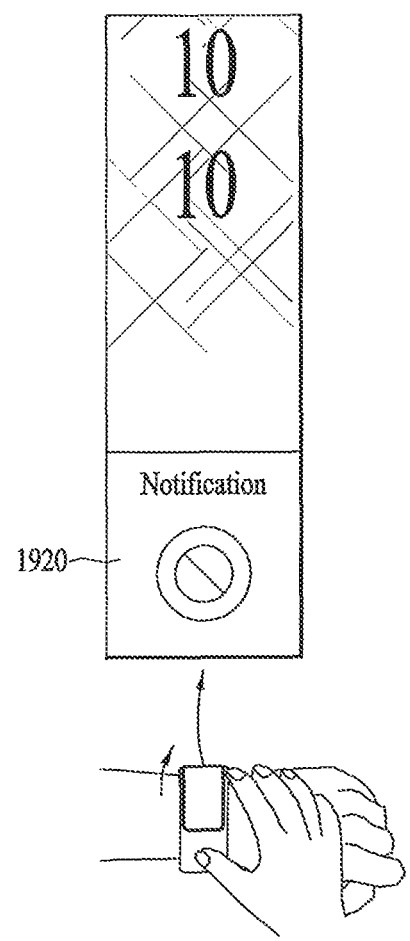
Figure 19C:
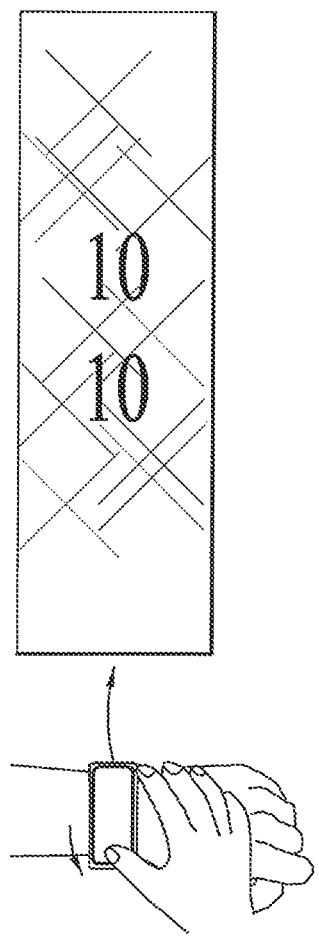

According to the example shown in FIG. 19B, outputted is an icon 1920 indicating that an alarm for a notification shall not go off owing to the interruption prohibition mode set to ON state. Moreover, the controller 180 can output a feedback indicating that the setting value of the interruption prohibition mode is set to ON state. In this case, the feedback may be outputted in form of vibration, alarm sound, light and/or the like.

Figure 20A:
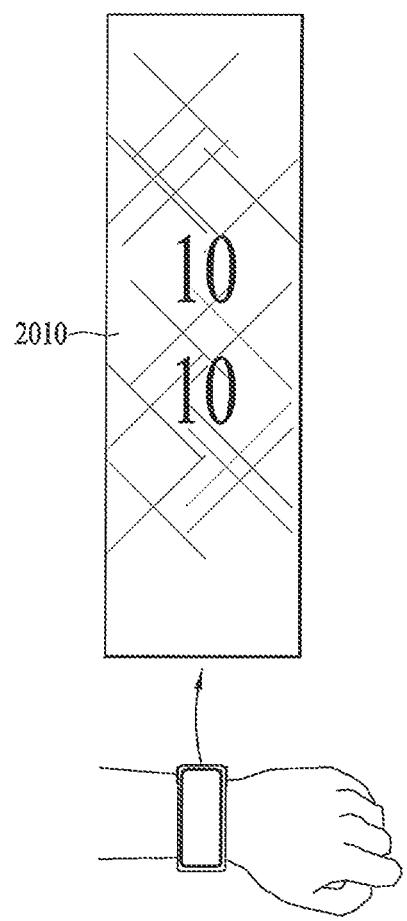

Referring to FIG. 20A, as the mobile terminal is rotated in a second direction opposite to the first direction, if the display unit 151 faces toward the same side of the back of the hand again, referring to FIG. 19C, the controller 180 may stop outputting the information 1920, which indicates that the setting value of the interruption prohibition mode is set to ON state, while maintaining the setting value (i.e., On) for the interruption prohibition mode. For another instance, after the display unit 151 has been rotated to face toward the same side of the back of the hand, only if a prescribed time expires, the controller 180 may stop outputting the information 1920 indicating that the setting value of the interruption prohibition mode is set to ON state.

While the home screen including the time information 2010 is outputted through the display unit 151, if a movement of the mobile terminal rotated in the second direction opposite to the first direction is detected and it is determined that the mobile terminal has rotated over a prescribed reference value, the controller 180 can control the setting value for the interruption prohibition mode of the mobile terminal to be set to OFF state. Moreover, the controller 180 can output an information 2020, which indicates that the interruption prohibition mode is set to OFF state, to be outputted through the display unit 151.

Figure 20B:
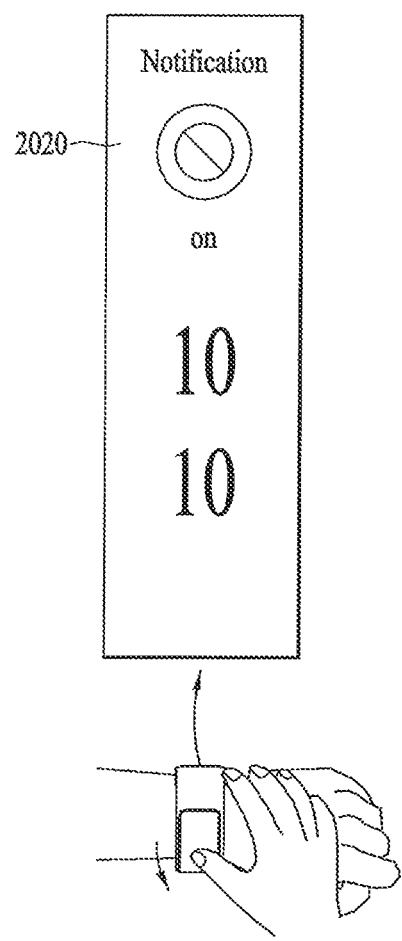

According to the example shown in FIG. 20B, as the interruption prohibition mode is set to OFF state, an icon 2020 indicating that an alarm for the notification will go off is outputted. Moreover, the controller 180 can output a feedback indicating that the setting value of the interruption prohibition mode is set to OFF state.

As the mobile terminal is rotated in the first direction opposite to the second direction, if the display unit 151 faces toward the same side of the back of the hand again, referring to FIG. 20C, the controller 180 may stop outputting the information, which indicates that the setting value of the interruption prohibition mode is set to OFF state, while maintaining the setting value (i.e., OFF) for the interruption prohibition mode. For another instance, after the display unit 151 has been rotated to face toward the same side of the back of the hand, only if a prescribed time expires, the controller 180 may stop outputting the information 2020 indicating that the setting value of the interruption prohibition mode is set to OFF state.

Figure 20C:
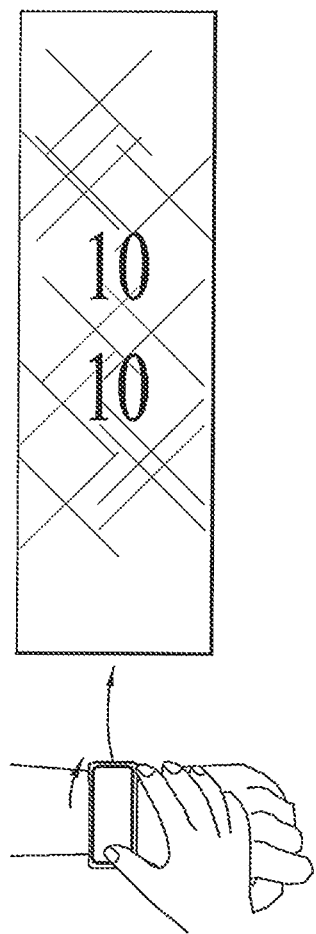

According to the example shown in FIGS. 20A-20C, only if the mobile terminal is rotated in the second direction opposite to the first direction, the setting value of the interruption prohibition mode is set to OFF state. For another instance, while the setting value of the interruption prohibition mode is set to ON, if the mobile terminal is rotated in the first direction, the controller 180 may control the setting value of the interruption prohibition mode to be set to OFF state as well.

According to the examples shown in FIG. 19A through FIG. 20C, the information indicating that the interruption prohibition mode is set to ON state or OFF state may be outputted from a side opposite to a direction of rotation of the mobile terminal. For instance, if the mobile terminal is rotated toward a top direction (i.e., a radius side), as shown in FIGS. 19A-19C. 19, the controller 180 can control an information, which indicates that the interruption prohibition mode is set to ON state, to be outputted through a bottom side of the display unit 151. For another instance, if the mobile terminal is rotated toward a bottom direction (i.e., an ulna side), as shown in FIGS. 20A-20C, the controller 180 can control an information, which indicates that the interruption prohibition mode is set to OFF state, to be outputted through a top side of the display unit 151.

Like the examples shown in FIG. 19A through FIG. 20C, based on a movement of rotating the mobile terminal in a top or bottom direction of a wrist, the controller 180 can adjust the setting values of the mobile terminal. Although the interruption prohibition mode is taken as one example in FIGS. 19A-19C or FIGS. 20A-20C, the above-described embodiment is applicable to adjustment of such a setting value as a sound/vibration mode, an activation of a communication module (e.g., Wi-Fi, Bluetooth, NFC, etc.), an airplane mode, or the like.

According to the examples shown in FIG. 19A through FIG. 20C, if the mobile terminal is rotated in a first direction (i.e., a top side of a wrist), the setting value is set to ON. If the mobile terminal is rotated in a second direction (i.e., a bottom side of a wrist), the setting value is set to OFF. Yet, the mapping relation between the rotation direction of the mobile terminal and the setting value may be non-limited by such examples.

FIG. 21A through FIG. 22B are diagrams for examples of searching for other music files in the course of playing music.

Figure 21A:
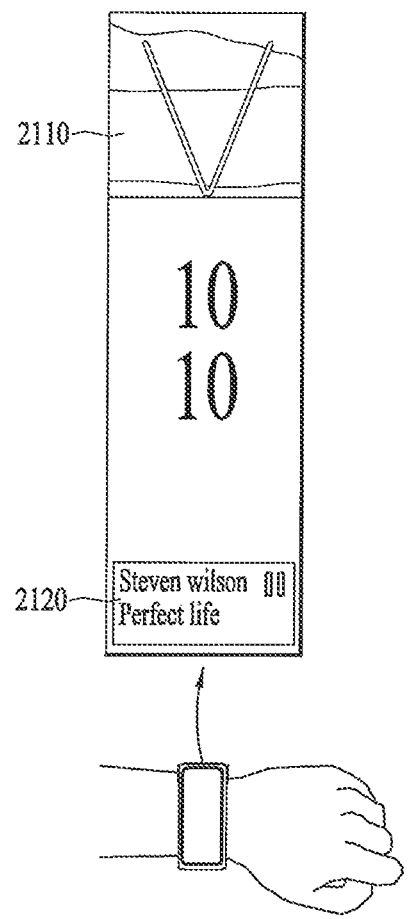
FIGS. 21A, 21B, 22A and 22B are diagrams for examples of searching for other music files in the course of playing music.
Figure 21B:
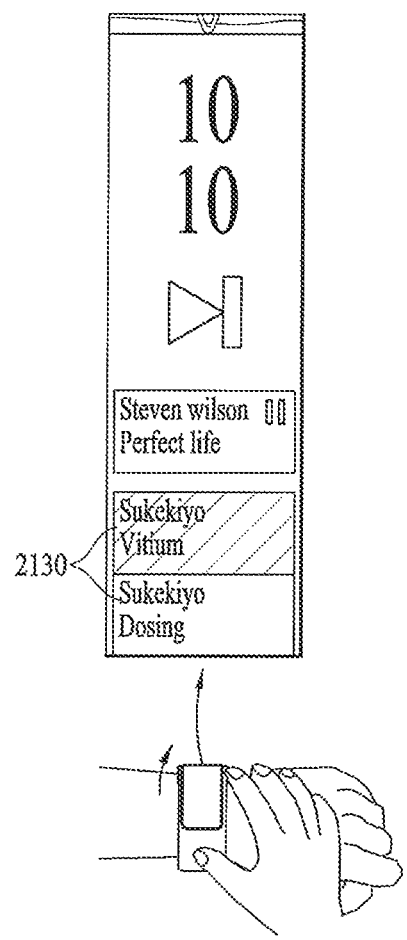

Referring to FIG. 21A, if a music is currently played, the controller 180 can control a currently played music information to be outputted through the display unit 151. FIG. 21A shows that an album art 2110 and a song information 2120 of the currently played music are outputted.

In doing so, if a movement of rotating the mobile terminal on a wrist in a first direction is detected, the controller 180 can control a music file list 2130 of a next order to be outputted through the display unit 151. Moreover, in accordance with a rotated degree of the mobile terminal, the controller 180 can select a prescribed music file from the music file list 2130 of the next order. For instance, if the mobile terminal is rotated by a first reference value, the controller 180 may control a first music file to be selected from the music file list 2130. If the mobile terminal is rotated by a second reference value greater than the first reference value, the controller 180 may control a second music file to be selected from the music file list 2130.

While a prescribed music file is selected from the music file list 2130, as the mobile terminal is rotated in a second direction, if the display unit faces toward the same side of the back of a hand again, the controller 180 can control the music file selected from the music file list 2130 to be played.

Figure 22A:
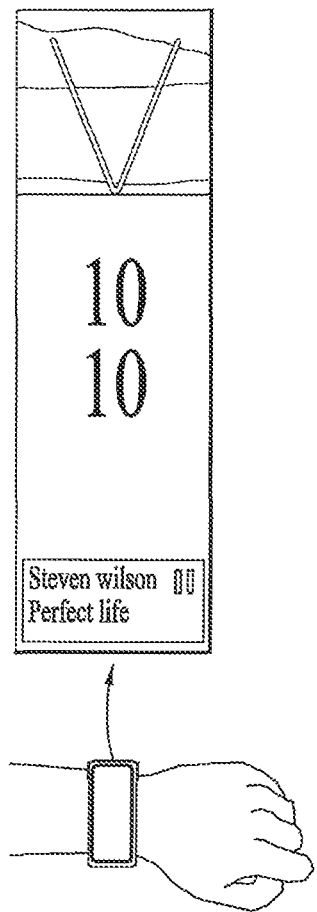
Figure 22B:
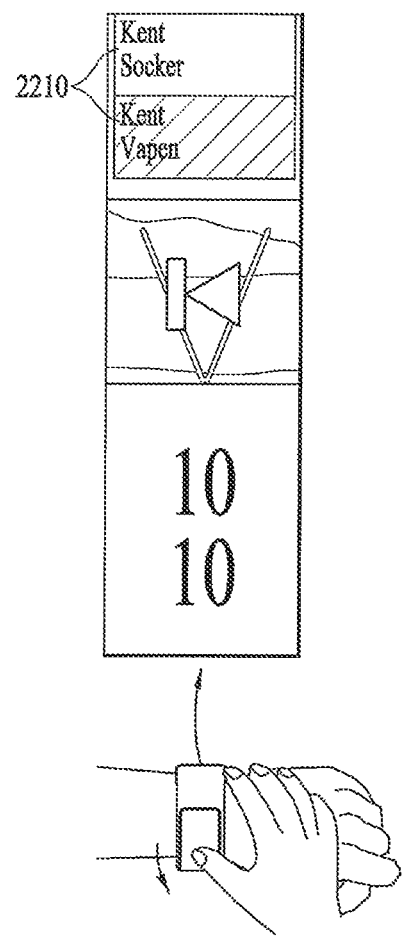

Referring to FIG. 22A, while the music file is played, if a movement of rotating the mobile terminal on the wrist in the second direction opposite to the first direction is detected, the controller 180 can control a music file list 2210 of a previous order to be outputted through the display unit 151. According to the example shown in FIG. 22B, the music file list 2210 of the previous order is outputted to a top end of the display unit 151. Moreover, in accordance with a rotated degree of the mobile terminal, the controller 180 can select a prescribed music file from the music file list 2210 of the previous order. For instance, if the mobile terminal is rotated by a first reference value, the controller 180 may control a first music file to be selected from the music file list 2210. If the mobile terminal is rotated by a second reference value greater than the first reference value, the controller 180 may control a second music file to be selected from the music file list 2210.

While a prescribed music file is selected from the music file list 2210, as the mobile terminal is rotated in a second direction, if the display unit faces toward the same side of the back of a hand again, the controller 180 can control the music file selected from the music file list 2210 to be played.

According to the examples shown in FIG. 21A through FIG. 22B, as the mobile terminal is rotated, a music file of an order next or previous to that of a currently played music file can be selected. Unlike the examples, in response to an input of rotating the mobile terminal, the controller 180 can change a play timing point of a currently played music file or adjust a volume a currently played music file.

FIGS. 23A-23D are diagrams for one example of handling an incoming call in response to a gesture of rotating a mobile terminal.

Referring to FIGS. 23A-23D, if there is an incoming call, the controller 180 can output a call connection screen indicating that there is the incoming call through the display unit 151. In doing so, as a user's arm having the mobile terminal worn thereon is unfolded, if a mode of the display unit 151 is set to a landscape mode, like the example shown in FIG. 23A, the controller 180 can display a call connection screen except information on a counterpart having made the phone call.

Figure 23A:
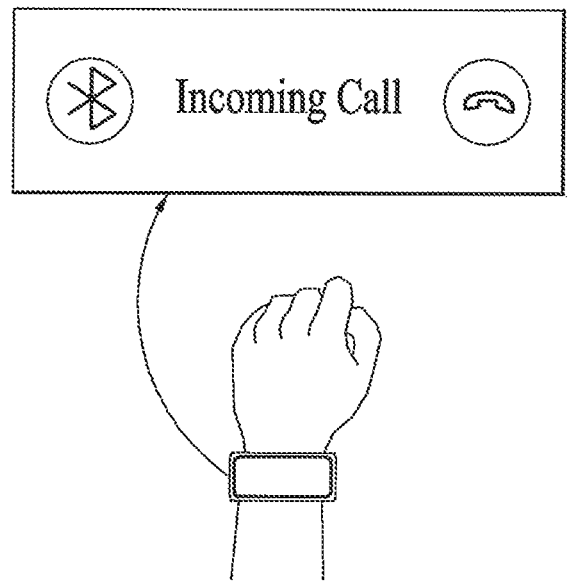
FIGS. 23A, 23B, 23C and 23D are diagrams for one example of handling an incoming call in response to a gesture of rotating a mobile terminal.
Figure 23B:
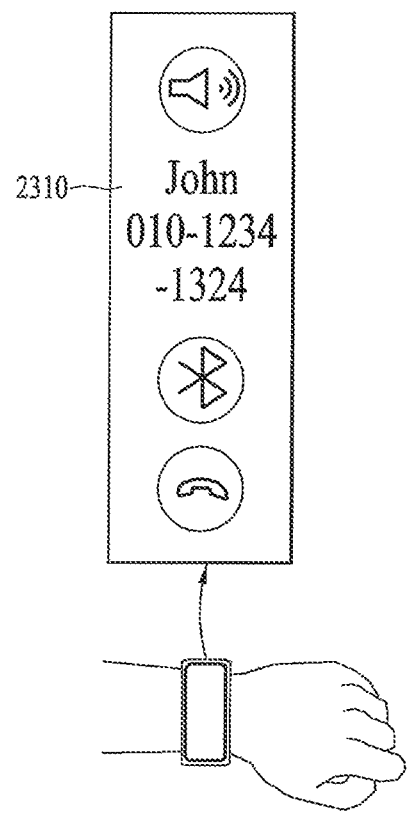

Thereafter, as the user folds the arm, if the display unit 151 is switched to a portrait mode, like the example shown in FIG. 23B, the controller 180 can control information 2310 on the counterpart having made the phone call to be outputted. According to the example shown in FIG. 23B, a name and phone number of a person having made the phone call are outputted.

The user may answer the call through a phone button included in the call connection screen or may hold to receive the call through a decline button included in the call connection screen.

Figure 23C:
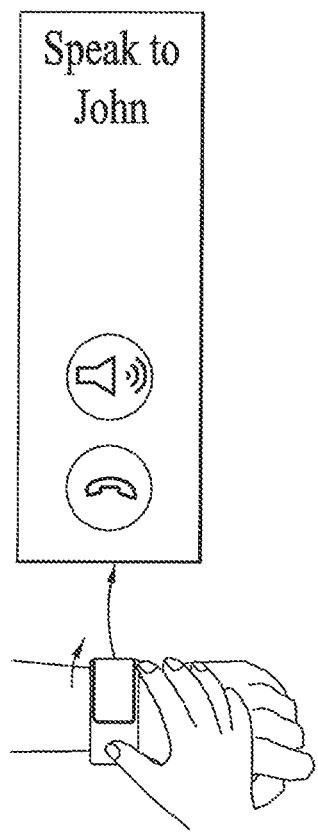

For another instance, referring to FIG. 23C, if a movement of rotating the mobile terminal on the wrist in a first direction is detected and it is determined that the mobile terminal has been rotated over a prescribed reference value, the controller 180 can control a phone call to be connected.

Figure 23D:
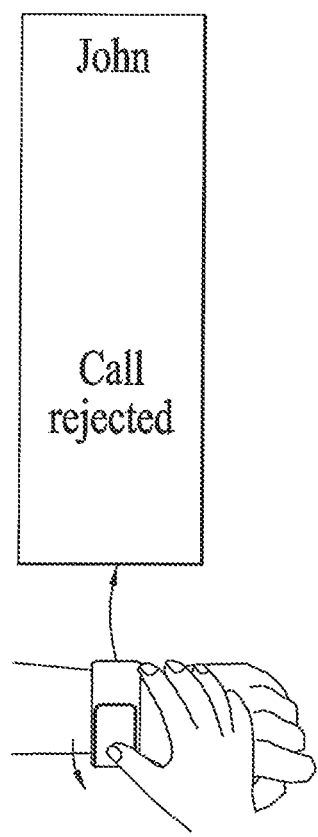

On the other hand, referring to FIG. 23D, if a movement of rotating the mobile terminal on the wrist in a second direction is detected and it is determined that the mobile terminal has been rotated over a first reference value, the controller 180 can hold to receive a phone call. If a value of the rotation of the mobile terminal in the second direction is equal to or greater than a second reference value greater than the first reference value, the controller 180 may register a phone number of the counterpart having made the phone call as a spam number.

According to the example shown in FIGS. 23A-23D, by a gesture of rotating the mobile terminal, an operation of answering a phone call or an operation of rejecting a phone call is performed. Unlike the example shown in the drawing, while the mobile terminal is worn, if a movement of rotating a wrist is detected, the controller 180 may control an operation of answering a phone call or an operation of rejecting a phone call to be performed.

Figure 24A:
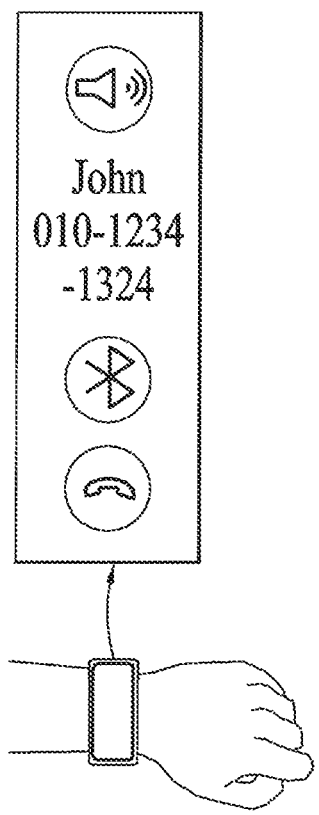
FIGS. 24A and 24B are diagrams for one example of handling an incoming call in response to a gesture of rotating a wrist.
Figure 24B:
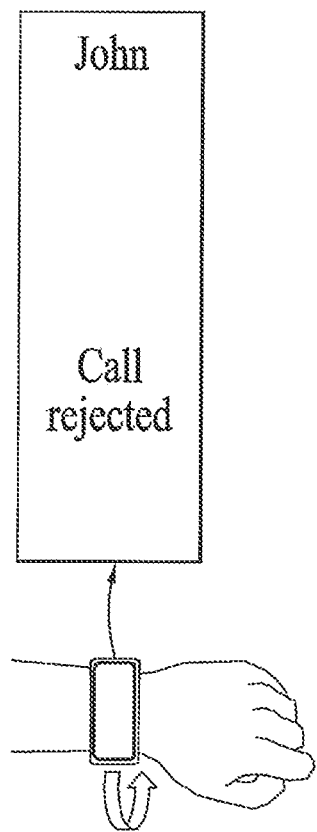

For instance, FIGS. 24A and 24B are diagrams for one example of handling an incoming call in response to a gesture of rotating a wrist.

Referring to FIGS. 24A and 24B, while there is an incoming call [FIG. 24A], if a user rotates a wrist having the mobile terminal worn thereon in a first direction, the controller 180 may reject the incoming call. If a gesture of rotating the wrist in the first direction is repeated over prescribed times, the controller 180 may control a phone number of a counterpart having made a phone call to be automatically registered as a spam number [FIG. 24B].

Accordingly, embodiments of the present invention provide various effects and/or features.

First of all, the present invention provides a mobile terminal and controlling method thereof, by which user's convenience can be enhanced.

In particular, the present invention provides a mobile terminal and controlling method thereof, by which whether to output a detailed information of an event is determined in accordance with an output mode of a display unit.

Moreover, the present invention provides a mobile terminal and controlling method thereof, by which whether to output a detailed information of an event is determined in accordance with a gesture input of moving the mobile terminal.

It will be appreciated by those skilled in the art that the present invention can be specified into other form(s) without departing from the spirit or scope of the inventions.

In addition, the above-described methods can be implemented in a program recorded medium as processor-readable codes. The processor-readable media may include all kinds of recording devices in which data readable by a processor are stored. The processor-readable media may include ROM, RAM, CD-ROM, magnetic tapes, floppy discs, optical data storage devices, and the like for example and also include carrier-wave type implementations (e.g., transmission via Internet).

It will be appreciated by those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A wearable watch type mobile terminal, comprising:
a wireless communication unit;
a display; and
a controller configured to:
 cause the display to display an object indicating an occurrence of an event while the display is positioned at a first location on a wrist;
 cause the display to display detailed information of the event in response to a gesture of rotating the mobile terminal around the wrist such that the display is positioned at another location on the wrist, wherein the detailed information is not displayed while the object is displayed on the display positioned at the first location prior to detecting the gesture, an amount of the displayed detailed information increasing as a rotation degree of the mobile terminal corresponding to the gesture is increased;
 cause the wireless communication unit to transmit information indicating that the detailed information has been displayed at the mobile terminal to another terminal that caused the occurrence of the event when the detailed information is displayed in response to the gesture; and
 cause the display to display detailed information of the event in response to a touch input received via the display on which the object is displayed, the detailed information displayed in response to the touch input displayed only while the touch input is maintained at the display, wherein the touch input comprises touching both edges of the display simultaneously, the touch input detected while the object is being displayed,
 wherein the information indicating that the detailed information has been displayed at the mobile terminal is not transmitted to the other terminal when the detailed information is displayed in response to the touch input.

2. The mobile terminal of claim 1, wherein:
the object is displayed while the display is positioned in a first orientation;
the controller is further configured cause the display to display the detailed information when the display is moved to be in a second orientation according to movement of an arm on which the mobile terminal is worn;

the display is set to a landscape mode, in which the display is positioned in the first orientation, when the arm is moved from a folded configuration to an unfolded configuration; and the display is set to a portrait mode, in which the display is positioned in the second orientation, when the arm is moved from the unfolded configuration to the folded configuration.

3. The mobile terminal of claim 2, wherein:

the display is divided into a right region and a left region by a virtual line when the display is set to the landscape mode; and the controller is further configured to cause the display to display the object via one of the right and left regions based on the arm such that the object is displayed via the right region when the arm is a left arm and the object is displayed via the left region when the arm is a right arm.

4. The mobile terminal of claim 2, wherein:

the display is divided into a top region and a bottom region by a virtual line when the display is set to the portrait mode; and the controller is further configured to cause the display to display the detailed information at the bottom region.

5. The mobile terminal of claim 2, wherein the controller is further configured to:

cause the display to display information related to currently played content when the display is set to the landscape mode; and cause the display to display a control screen for controlling a play of the content when the display is switched to the portrait mode from the landscape mode.

6. The mobile terminal of claim 1, wherein the controller is further configured to input a text, which is converted from a voice received via a microphone, as a message in response to the event when a gesture of lifting the mobile terminal is detected while the detailed information is displayed.

7. The mobile terminal of claim 1, wherein the object is no longer displayed when the detailed information is displayed.

8. The mobile terminal of claim 7, wherein the controller is further configured to cause the display to display a maximum amount of the detailed information when the rotation degree of the mobile terminal is increased to 180 degree.

9. The mobile terminal of claim 1, wherein the event comprises at least one of a text message, an instant message, or an email.

10. The mobile terminal of claim 1, wherein the detailed information displayed in response to the touch input is no longer displayed when the touch input is released from the display.

11. The mobile terminal of claim 1, wherein the controller is further configured to cause the display to display time information, the object not displayed, when no event is detected at the mobile terminal.

12. The mobile terminal of claim 11, wherein the controller is further configured to cause the display to display content received from a feed server in response to a second gesture of rotating the mobile terminal on a wrist, the second gesture detected while the time information is displayed.

13. The mobile terminal of claim 12, wherein the content comprises at least one of location information, weather information, or news information.

14. The mobile terminal of claim 1, wherein the controller is further configured to adjust a setting value of the mobile terminal in response to a second gesture of rotating the mobile terminal on a wrist.

15. The mobile terminal of claim 14, wherein the setting value comprises at least one of an interruption prohibition mode, an airplane mode, or a vibration mode.

16. The mobile terminal of claim 15, wherein the controller is further configured to:

set the setting value to an ON state when the mobile terminal is rotated on the wrist in a first direction; and set the setting value to an OFF state when the mobile terminal is rotated on the wrist in a second direction.

17. The mobile terminal of claim 1, wherein the controller is further configured to:

cause the display to display a call connection screen indicating reception of an incoming call in response to the incoming call that is detected while the display is positioned in the first orientation; and cause the display to display information corresponding to an external terminal associated with the incoming call in the call connection screen when the display is moved to be in the second orientation.

18. The mobile terminal of claim 17, wherein the controller is further configured to answer or reject the incoming call in response to a gesture of rotating the mobile terminal on a wrist.

19. A method for controlling a wearable watch type mobile terminal, comprising:

displaying an object indicating an occurrence of an event on a display while the display is positioned at a first location on a wrist;

displaying detailed information of the event in response to a gesture of rotating the mobile terminal around the wrist such that the display is positioned at another location on the wrist, wherein the detailed information is not displayed while the object is displayed on the display positioned at the first location prior to detecting the gesture, an amount of the displayed detailed information increasing as a rotation degree of the mobile terminal corresponding to the gesture is increased;

transmitting information indicating that the detailed information has been displayed at the mobile terminal to another terminal that caused the occurrence of the event when the detailed information is displayed in response to the gesture; and displaying detailed information of the event in response to a touch input received via the display on which the object is displayed, the detailed information displayed in response to the touch input displayed only while the touch input is maintained at the display, wherein the touch input comprises touching both edges of the display simultaneously, the touch input detected while the object is being displayed, wherein the information indicating that the detailed information has been displayed at the mobile terminal is not transmitted to the other terminal when the detailed information is displayed in response to the touch input.

20. The mobile terminal of claim 8, wherein the controller is further configured to cause the display to display a second object associated with a function related to the detailed information when the display is positioned at a second location corresponding to the rotation degree of 180 degree, the function executed in response to an input received via the second object, wherein the second object is not displayed when the display is positioned at the first location and when the rotation degree is less than 180 degree.

* * * * *